United States Patent
Fletcher

(10) Patent No.: US 10,222,238 B2
(45) Date of Patent: Mar. 5, 2019

(54) MAGNETIC FIELD GENERATOR AND POSITION SENSING ASSEMBLY

(71) Applicant: ROTA ENGINEERING LIMITED, Bury (GB)

(72) Inventor: Bruce Fletcher, Oldham (GB)

(73) Assignee: ROTA ENGINEERING LIMITED, Bury (GB)

( * ) Notice: Subject to any disclaimer, the term of this patent is extended or adjusted under 35 U.S.C. 154(b) by 22 days.

(21) Appl. No.: 15/513,787

(22) PCT Filed: Sep. 22, 2015

(86) PCT No.: PCT/GB2015/052742
§ 371 (c)(1),
(2) Date: Mar. 23, 2017

(87) PCT Pub. No.: WO2016/046537
PCT Pub. Date: Mar. 31, 2016

(65) Prior Publication Data
US 2017/0241806 A1    Aug. 24, 2017

(30) Foreign Application Priority Data
Sep. 24, 2014   (GB) .................................. 1416870.2

(51) Int. Cl.
*G01D 5/14* (2006.01)
*G01F 23/74* (2006.01)

(52) U.S. Cl.
CPC ............. *G01D 5/145* (2013.01); *G01F 23/74* (2013.01)

(58) Field of Classification Search
CPC ..................................................... G01D 5/145
See application file for complete search history.

(56) References Cited

U.S. PATENT DOCUMENTS 4,692,732 A    9/1987 Leupold
6,211,668 B1    4/2001 Duesler et al.
(Continued)

FOREIGN PATENT DOCUMENTS

EP    1548408 A2    6/2005
EP    1 553 387 A1    7/2005
(Continued)

OTHER PUBLICATIONS

Communication pursuant to Article 94(3) EPC issued for EP 15770629.2-1022 dated Mar. 23, 2018, 7 pages.
(Continued)

*Primary Examiner* — Walter L Lindsay, Jr.
*Assistant Examiner* — Milton Gonzalez
(74) *Attorney, Agent, or Firm* — Klintworth & Rozenblat IP LLP

(57) ABSTRACT

A magnetic field generator (50) having at least one magnet (51) extending along a longitudinal axis (101), wherein the magnetic material of the at least one magnet is arranged such that the at least one magnet produces a magnetic field with a magnetic flux density that changes substantially continuously in magnitude in the axial direction substantially along the length of the at least one magnet in the axial direction such as to enable the axial position of the magnetic field generator to be determined by a position sensing assembly comprising the magnetic field generator (50) and at least one magnetic sensor (105).

9 Claims, 24 Drawing Sheets

SECTION B-B

(56) References Cited

U.S. PATENT DOCUMENTS

| | | | | |
|---|---|---|---|---|
| 6,653,830 | B2* | 11/2003 | Luetzow | G01D 5/145 324/207.21 |
| 7,166,996 | B2* | 1/2007 | Godkin | G01D 5/145 324/207.2 |
| 8,373,410 | B2* | 2/2013 | Frachon | G01D 5/145 324/207.21 |
| 8,698,738 | B2* | 4/2014 | Sakurai | G06F 3/0354 345/156 |
| 2003/0030958 | A1 | 2/2003 | Saito et al. | |
| 2003/0094941 | A1 | 5/2003 | Mizutani | |
| 2006/0114221 | A1* | 6/2006 | Sakurai | G06F 3/0354 345/156 |
| 2009/0033315 | A1 | 2/2009 | Kawashima | |
| 2009/0278641 | A1 | 11/2009 | Hedayat | |
| 2010/0188074 | A1 | 7/2010 | Matsumoto | |
| 2010/0308805 | A1 | 12/2010 | Stuve | |
| 2011/0120300 | A1 | 5/2011 | Fletcher et al. | |

FOREIGN PATENT DOCUMENTS

| | | |
|---|---|---|
| EP | 1826534 A2 | 8/2007 |
| JP | 2012 194028 A | 10/2012 |
| WO | 2005/078395 A1 | 8/2005 |

OTHER PUBLICATIONS

Search Report from corresponding Great Britain Patent Application No. GB14168702 dated Jan. 31, 2015, 2 pages.

International Search Report for PCT/GB2015/052742, dated Apr. 12, 2015, 3 pages.

Official Action for Korean Patent Application No. 10-2017-7010744 dated May 17, 2018, 9 pages.

Translation of Official Action for Korean Patent Application No. 10-2017-7010744 dated May 17, 2018, 16 pages.

* cited by examiner

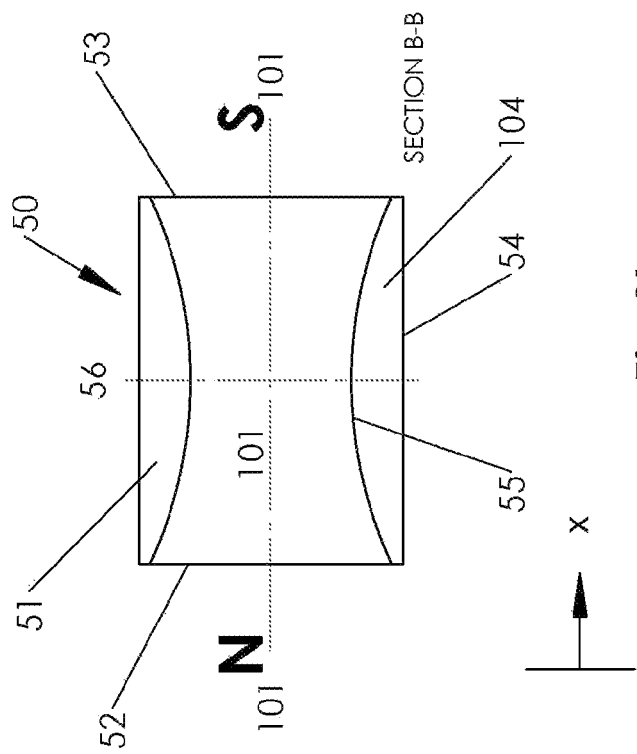
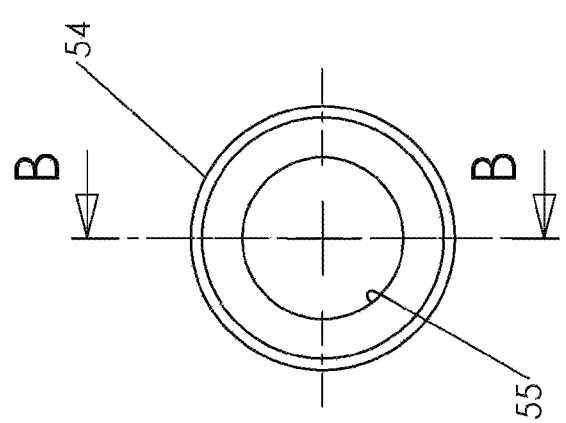
Fig.3b
Fig.3a

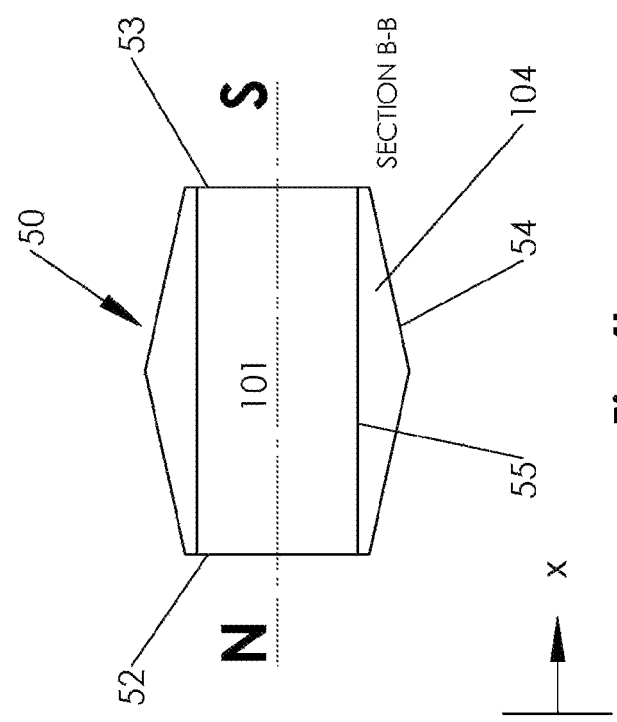
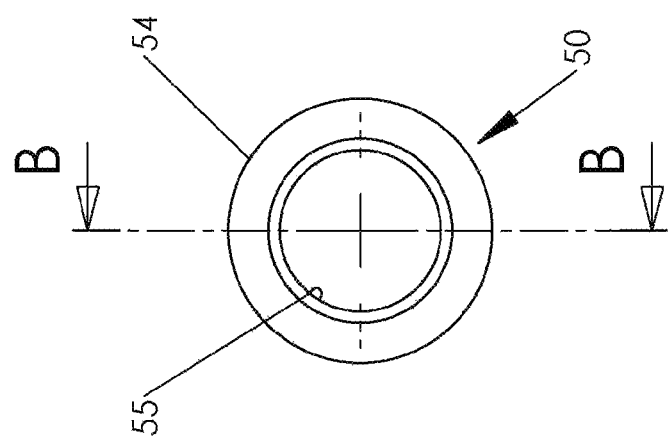
Fig. 4b
Fig. 4a

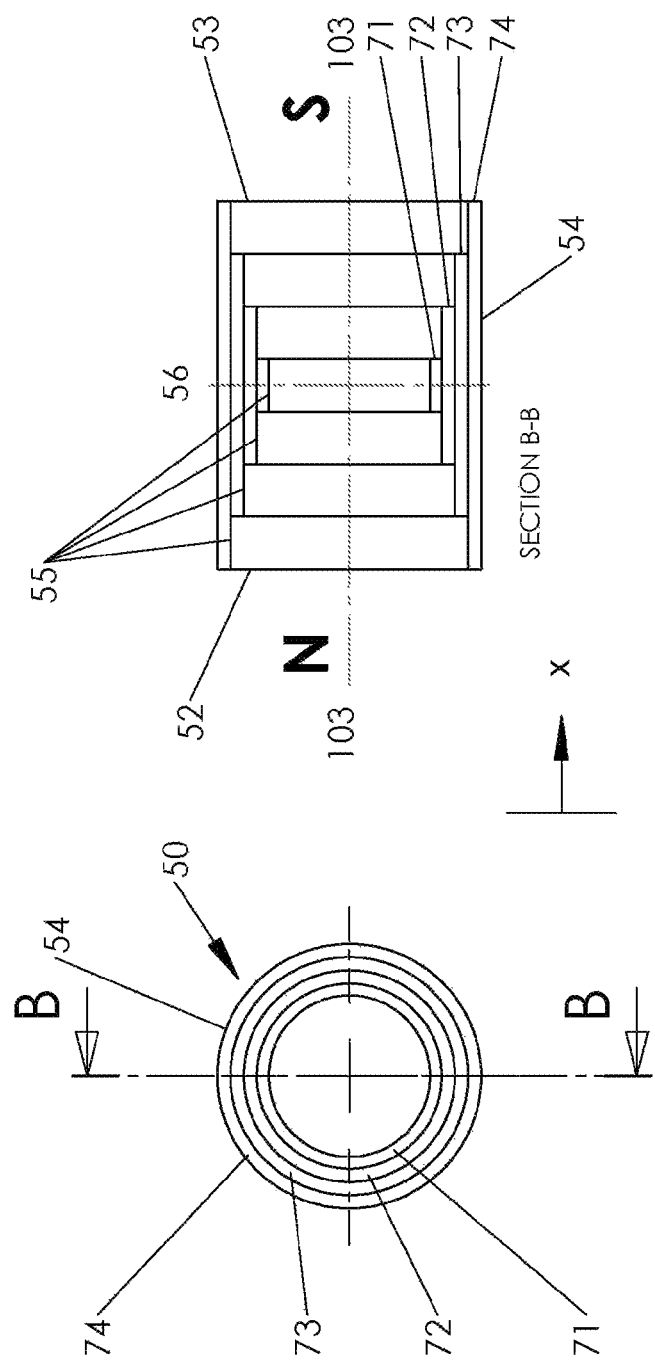

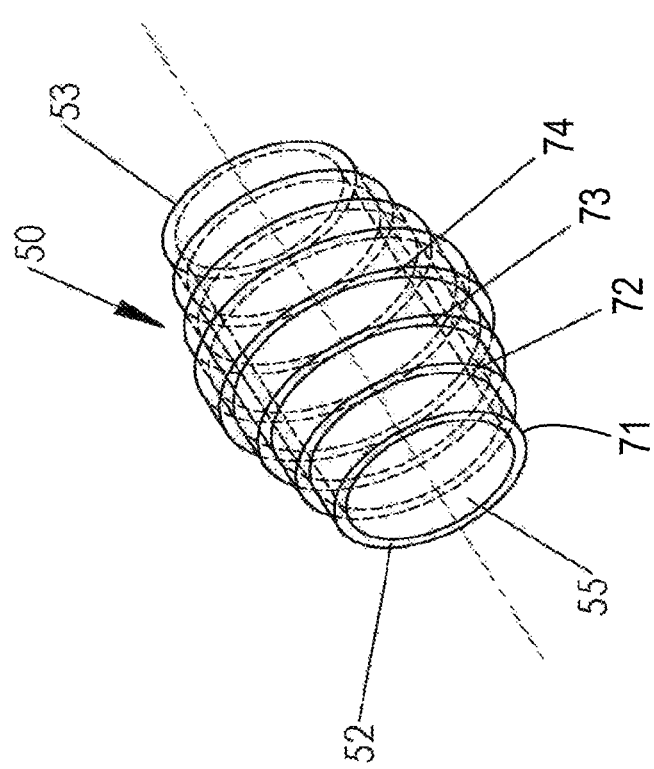

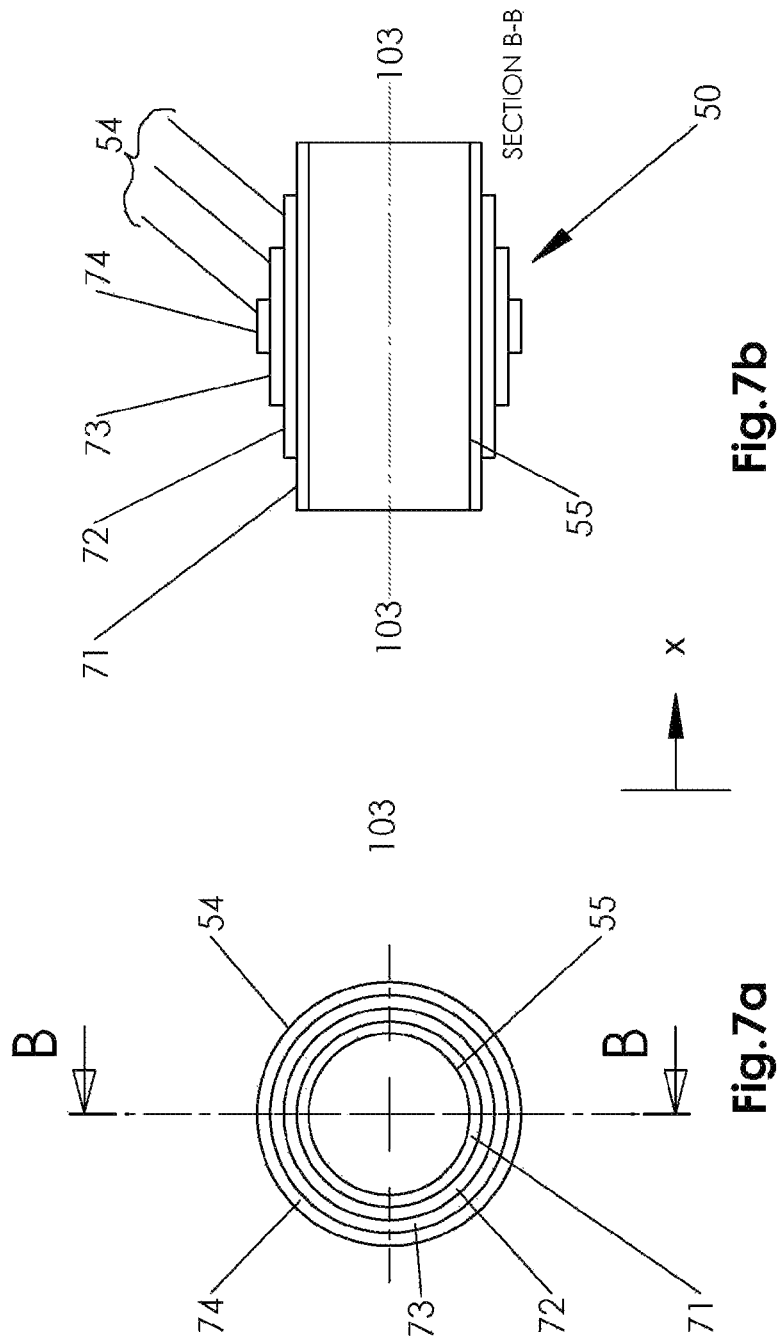

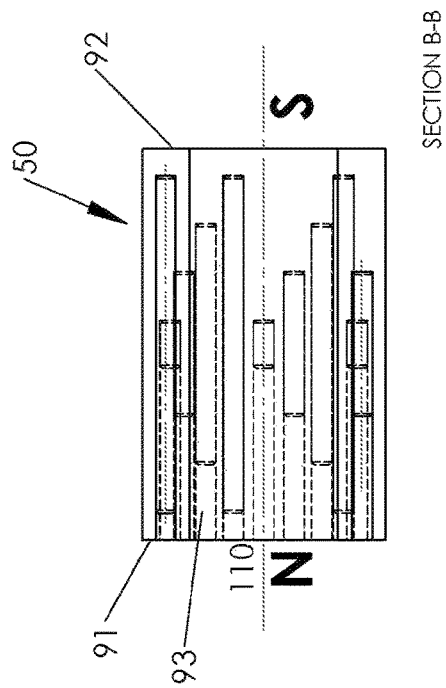
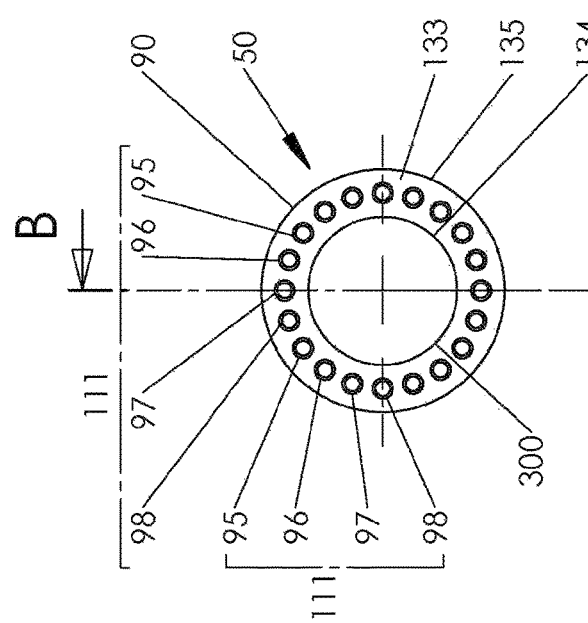
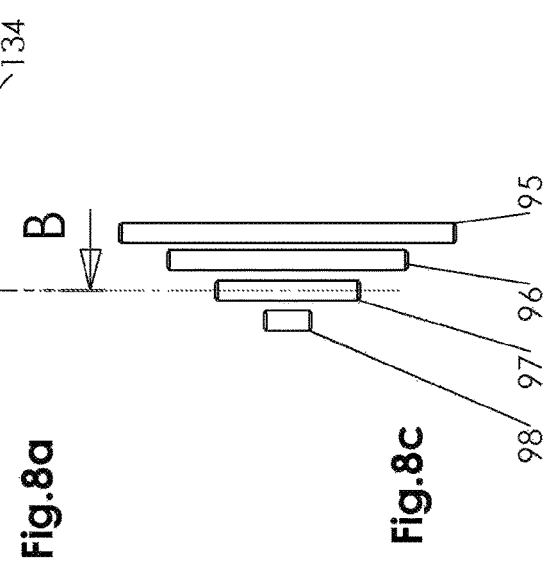

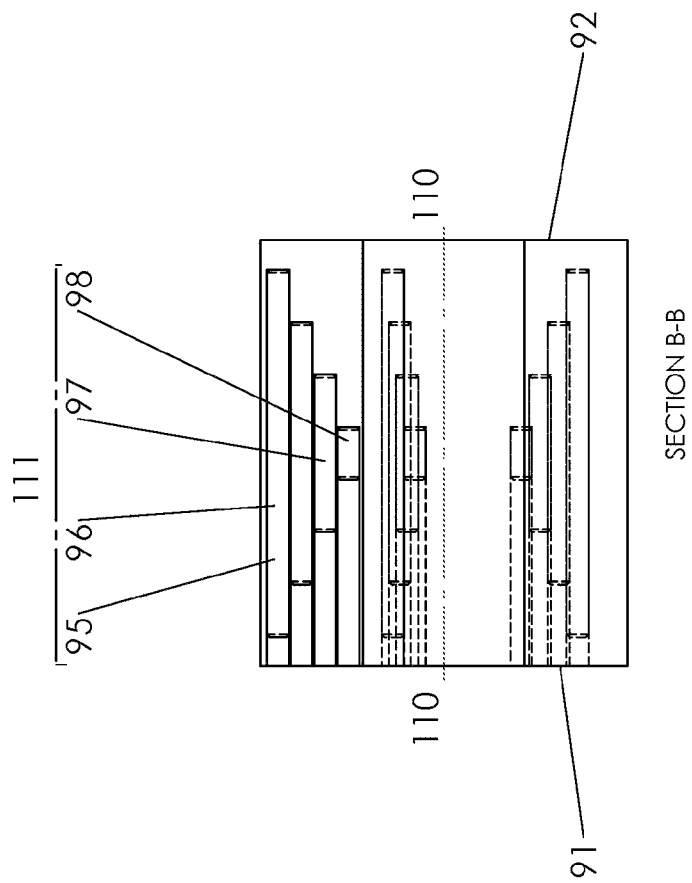
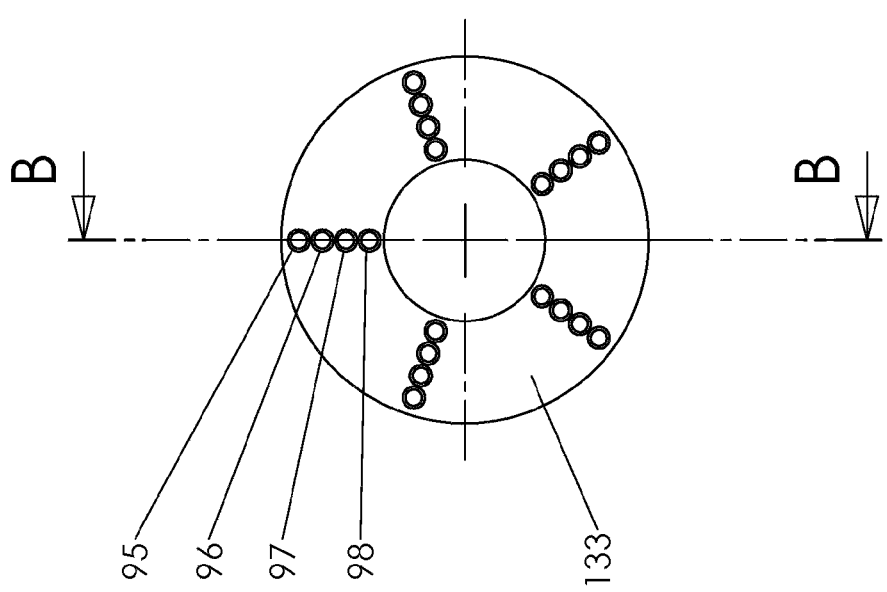
Fig. 9b
Fig. 9a

MAGNETIC FIELD GENERATOR AND POSITION SENSING ASSEMBLY

The present invention relates to a magnetic field generator and position sensing assembly for detecting the position of a magnetic field generator.

In many applications it is desirable to detect the position of a movable member. For example, where hydraulic or pneumatic cylinder actuators are used to control the movement or positioning of an object it is often desirable to determine the displacement of the actuator.

A typical hydraulic or pneumatic piston actuator comprises a cylinder that houses a slidable piston and piston rod assembly arranged for reciprocal movement in the axial direction. The piston is sealed to the inside surface of the cylinder so as to divide the cylinder into two chambers and is moveable, under the influence of hydraulic or pneumatic fluid introduced under pressure into one or other of the chambers, between a retracted stroke position in which the piston rod is substantially wholly received within the housing and an extended stroke position in which the length of the rod projects out of the housing. The movement of the piston is typically effected by using one or more control valves to introduce the fluid into the chambers. In order to ensure accurate positioning it is desirable to operate the control valves in response to a feedback signal representing the position of the piston or piston rod relative to the cylinder in which case it is necessary to have the ability to sense the stroke position of the piston or piston rod in an accurate manner.

In one approach, a series of Hall-effect sensors or Hall effect elements are arranged in a linear array in a tube along the bore in the piston rod and a permanent magnet fitted to the piston rod slides relative to the tube thus activating each of the sensors in turn.

On longer hydraulic cylinders it is economically advantageous to use fewer Hall effect devices in the electronic position transducer. This can be achieved by increasing the strength of the magnetic field so that the length of the magnetic field in the axial direction is increased. This provides a wider Hall output curve width which enables the number of Hall effect devices to be reduced.

One way this can be achieved is by increasing the diameter of the magnet. However, this is undesirable as it requires drilling a larger diameter bore in the piston assembly, in order to accommodate the larger diameter magnet, which weakens the piston assembly. This is especially a problem in small diameter cylinders. In addition, increasing the diameter of the magnet increases the cost of the magnet significantly.

Another way this can be achieved is by increasing the length of the magnet. However this suffers from the problem that the magnetic field produced by the magnet has a central section, between the magnetic poles of the magnet, that has substantially no change in magnetic flux density, i.e. the magnetic flux density in this region is substantially constant. Therefore, when the piston is in a certain range of axial positions, the Hall voltage produced on one or more Hall-effect sensors in this section of magnetic field, is substantially constant. Therefore, the resolution of the sensed axial positions of the piston/piston rod by the Hall-effect sensors is significantly reduced.

Similar problems exist where the magnetic field generator is used in other applications, such as in a float with a magnetic sensor arranged to determine the level of the float. Larger magnets increase the float diameter, subsequently increasing the diameter of the access port required in the top of the tank for installation.

It is an object of the present invention, amongst others, to obviate or mitigate the aforementioned disadvantages. It is also an object to provide for an improved magnetic field generator. It is also an object of the invention to provide an improved position sensing assembly.

According to a first aspect of the present invention there is provided a magnetic field generator comprising at least one magnet extending along a longitudinal axis, wherein the magnetic material of the at least one magnet is arranged such that the at least one magnet produces a magnetic field with a magnetic flux density that changes substantially continuously in magnitude in the axial direction substantially along the length of the at least one magnet in the axial direction.

This allows the magnetic field produced by the magnetic field generator to be relatively long, without the magnetic field having a section of substantially no change in magnitude of magnetic flux density, for example at a central area between the magnetic poles of the at least one magnet. This is advantageous where a magnetic sensor arrangement is arranged to determine the axial position of the magnetic field generator. In this regard, because the magnetic flux density changes substantially continuously in magnitude in the axial direction, substantially along the axial length of the magnetic field generator, the resolution of the sensed axial positions of the magnetic field generator by the magnetic sensor arrangement is significantly increased (relative to if the magnetic field did not vary substantially continuously in the axial direction). This allows the magnetic sensor arrangement to use relatively few magnetic sensors, which saves cost.

In addition, this allows the diameter of the magnetic field generator to be relatively small, as compared to if an axially uniform magnet was used and the diameter of the axially uniform magnet increased so as to provide a magnetic field of a similar length. Accordingly, when the magnetic field generator is housed within a bore in a piston, for example of a linear actuator, this allows the bore to be of a relatively small diameter, which maintains the structural integrity of the piston. Similar advantages arise where the magnetic field generator is used in other applications, such as in a float with a magnetic sensor arranged to determine the level of the float. For example, the relatively small diameter of the magnetic field generator allows the float to be of a relatively small diameter. This advantageously allows an access port in a chamber containing a fluid, that the float is arranged to measure the level of, to be of a relatively small diameter.

Optionally, the amount of magnetic material of the at least one magnet in a plane substantially perpendicular to the axis varies with the axial position of the plane such that the at least one magnet produces a magnetic field with a magnetic flux density that changes substantially continuously in magnitude in the axial direction substantially along the length of the at least one magnet in the axial direction.

The amount of magnetic material may be varied by increasing and/or decreasing the amount of magnetic material in said plane as the axial position of the plane varies.

The amount of magnetic material may be varied by at least one discrete change in the amount of magnetic material in said plane as the axial position of the plane varies.

Alternatively, or additionally, the amount of magnetic material may be varied by at least one continuous change in the amount of magnetic material in said plane as the axial position of the plane varies, along at least a section of the length of the at least one magnet in the axial direction. The amount of magnetic material may be varied by a continuous change in the amount of magnetic material in said plane as the axial position of the plane varies, substantially along the length of the at least one magnet in the axial direction.

The variation in the amount of magnetic material in said plane, with the axial position of the plane, may be linear. Alternatively, or additionally, the variation may be non-linear.

The at least one magnet may extend in the axial direction from a first end, that forms a first pole, to a second end, that forms a second pole, wherein the amount of magnetic material in said plane increases from the first and/or second ends of the magnet towards the midpoint between the first and second ends.

This is advantageous in that it increases the magnetic flux density of the magnetic field produced by the at least one magnet in the central section between the magnetic poles of the magnet. This prevents the magnetic field, in this central section, having substantially no change in magnetic flux density.

The at least one magnet may comprise a wall of magnetic material having a thickness that extends from a radially inner surface to a radially outer surface, wherein the thickness of the wall of magnetic material varies with axial position so as to provide said variation in magnetic material with axial position.

The variation in thickness may be substantially continuous with axial position. The thickness may vary as one or more step changes with axial position. The variation in thickness with axial position may be linear or non-linear.

The radius of the radially inner and/or outer surface may vary with axial position so as to provide said variation of magnetic material in the axial direction.

The at least one magnet may be arranged such that as the radially inner surface extends from the first and/or second ends of the at least one magnet towards the midpoint between the first and second ends, the radial distance between the radially inner surface and the axis decreases. In this respect, as the radially inner surface extends from the first and/or second ends of the at least one magnet towards the midpoint, the distance in the radial direction between diametrically opposite points on the radially inner surface decreases. The decrease in radial distance maybe linear or non-linear. In this case, the radius of the radially outer surface may be substantially constant with axial position.

The at least one magnet may be arranged such that as the radially outer surface extends from the first and/or second ends of the at least one magnet towards the midpoint between the first and second ends, the radial distance between the radially outer surface and the axis increases. In this respect, as the radially outer surface extends from the first and/or second ends of the at least one magnet towards the midpoint, the distance in the radial direction between diametrically opposite points on the radially outer surface increases. In this case, the radius of the radially inner surface may be substantially constant with axial position. The increase in radial distance maybe linear or non-linear.

The at least one magnet may be substantially elongate, with its length extending along said axis. The at least one magnet may have a substantially circular cross-sectional shape about said axis. The at least one magnet may have different cross-sectional shapes about said axis.

The at least one magnet may comprise a plurality of magnets that have different lengths in the axial direction and overlap in the axial direction such that the amount of magnetic material of the at least one magnet in a plane substantially perpendicular to the axis varies with the axial position of the plane such that the at least one magnet produces a magnetic field with a magnetic flux density that changes substantially continuously in magnitude in the axial direction substantially along the length of the at least one magnet in the axial direction.

The overlapping arrangement maybe such that amount of magnetic material in a plane substantially perpendicular to the axis varies with the axial position of the plane by at least one discrete change in the amount of magnetic material in said plane as the axial position of the plane varies.

Optionally the magnets are distributed radially in a nested arrangement.

In this regard, a first of the magnets is disposed radially inwardly of, and received within, a second of the magnets. The second of the magnets may be radially inwardly of, and received within, a third of the magnets. The third of the magnets may be radially inwardly of, and received within, a fourth of the magnets. The nested arrangement may comprise more, or fewer, magnets.

The magnets may be substantially concentrically aligned with each other.

Each magnet may be substantially annular, extending in a circumferential direction about its longitudinal axis. Each magnet may be a substantially hollow cylinder.

Radially adjacent magnets may contact each other along at least a section of their overlapping lengths in the axial direction.

Optionally the magnets are distributed circumferentially about the longitudinal axis and are located at substantially the same radius from the longitudinal axis.

Optionally the magnets are disposed within a wall of a housing of magnetically insulating material. The magnets may be separated from each other by the magnetically insulating material. Alternatively the magnets may be in contact with each other. Each magnet may be received within a bore in a wall of the housing. Each magnet may be substantially enclosed by the magnetically insulating material.

Optionally the magnets are distributed in the circumferential and/or radial direction, relative to the longitudinal axis.

The magnetic field generator may comprise one or more sets of magnets, each set comprising at least a pair of magnets of different lengths disposed within the wall of the housing. The magnets of a set may be substantially aligned circumferentially or radially within the wall. Where the magnets of a set are aligned radially, the sets may be distributed in the circumferential direction. Where the magnets of a set are aligned circumferentially, the sets of magnets may be aligned with each other in the circumferential direction. In this regard, the magnets of the sets may be located at substantially the same radius from the longitudinal axis. Alternatively, the magnets of a set may be distributed circumferentially such that in a circumferential direction, the radius of the magnets from the longitudinal axis increases. The magnets of a set may be located at different radial and/or circumferential locations.

Each magnet may be substantially solid. The at least one magnet may be a bar, rod or cylinder magnet. Alternatively, the magnets may have different cross-sectional shapes, for example square, triangular, etc.

Alternatively, or additionally, the distance between the magnetic material of the at least one magnet and the axis, at each axial position, may be varied with axial position such that the at least one magnet produces a magnetic field with a magnetic flux density that changes substantially continuously in magnitude in the axial direction substantially along the length of the at least one magnet in the axial direction.

The distance between the magnetic material of the at least one magnet and the axis, at each axial position, may be varied linearly or non-linearly with axial position.

The distance between a radially inner surface of the at least one magnet and the axis may be varied with axial position to produce said change in magnetic flux density.

The at least one magnet may extend in the axial direction from a first end, that forms a first pole, to a second end, that forms a second pole, wherein as the radially inner surface extends from the first and/or second ends of the at least one magnet towards the midpoint between the first and second ends, the radial distance between the radially inner surface and the axis decreases. In this respect, as the radially inner surface extends from the first and/or second ends of the at least one magnet towards the midpoint, the distance in the radial direction between diametrically opposite points on the radially inner surface decreases.

The amount of magnetic material of the at least one magnet in a plane substantially perpendicular to the axis may be substantially constant with the axial position of the plane. In this respect, the thickness of the at least one magnet may be substantially constant with the axial position. The radially outer surface may be substantially parallel to the radially inner surface.

Alternatively, or additionally, the density of the magnetic material of the at least one magnet may be varied with axial position such that the at least one magnet produces a magnetic field with a magnetic flux density that changes substantially continuously in magnitude in the axial direction substantially along the length of the at least one magnet in the axial direction.

Alternatively, or additionally, the strength of the magnetic material of the at least one magnet may be varied with axial position such that the at least one magnet produces a magnetic field with a magnetic flux density that changes substantially continuously in magnitude in the axial direction substantially along the length of the at least one magnet in the axial direction.

The strength of the magnetic material of the at least one magnet may be varied with axial position by varying the chemical composition of the magnetic material with axial position.

The at least one magnet may comprise at least one axially extending strip of magnetic material that extends in the circumferential direction partly about the longitudinal axis.

The at least one magnet may comprise a plurality of said strips circumferentially spaced about the longitudinal axis.

The magnetic field generator may comprise a housing of a magnetically insulating material, wherein the at least one strip is fixedly attached to the housing. The at least one strip may be fixedly attached to a radially inner surface of the housing.

According to a second aspect of the present invention there is provided a position sensing assembly comprising a movable member arranged to move along an axis, wherein a magnetic field generator according to the first aspect of the invention is coupled to the movable member, to move with the movable member, and a magnetic sensor arrangement comprising at least one magnetic sensor arranged to determine the axial position of the magnetic field generator.

The magnetic field generator may be mounted internally or externally of the movable member. The magnetic field generator may be mounted in a bore in the movable member. The magnetic field generator may be directly attached to the movable member. Alternatively, the magnetic field generator may be coupled to the movable member by a coupling member that moves the magnetic field generator in dependence on the axial position of the movable member.

The movable member may be arranged to move axially relative to a magnetic sensor housing, within which the magnetic sensor arrangement is provided. The magnetic sensor housing may be disposed radially inwardly of the magnetic field generator. Alternatively, the magnetic sensor housing may be disposed radially outwardly of the magnetic field generator. The magnetic sensor housing may extend in the axial direction, with the movable member constrained to move in the axial direction by the magnetic sensor housing. The magnetic sensor housing may be tubular.

The movable member may be made of a non-magnetic material. For example, the movable member may be made of a magnetically insulating material, for example Austenitic Stainless Steel, Aluminium or Nylon.

In this case, the at least one magnet may contact the movable member.

The movable member may be made of a ferromagnetic material, for example magnetic carbon, steel or iron. In this case, the at least one magnet may be arranged such that it does not contact the movable member.

In this respect, a spacer of magnetically insulating material may be provided between the at least one magnet of the magnetic field generator and the movable member. The at least one magnet of the magnetic field generator may be disposed in a housing of magnetically insulating material. This is advantageous in that it acts to increase the axial length of the magnetic field.

Where the at least one magnet comprises said at least one strip of magnetic material, the at least one strip may be coupled to the movable member such that it is axially fixed relative to the movable member. The at least one strip may be directly attached to the movable member. Where the at least one strip is fixedly attached to a housing of magnetically insulating material, the housing of magnetically insulating material may be fixedly attached to the movable member.

The at least one strip may be coupled to the movable member at a circumferential location that produces a maximum sensed signal from the at least one magnetic sensor. In this regard, the at least one strip may be coupled to the movable member at a location that is circumferentially aligned with the at least one magnetic sensor.

The at least one strip may be fixedly attached to the movable member by any suitable means of fastening, including by pinning.

Optionally the at least one magnetic sensor is a Hall-effect sensor. The at least one magnetic sensor may be any suitable type of magnetic sensor, for example a magneto-resistive element or GMR (giant magneto-resistive) technology.

Optionally the at least one magnet comprises a plurality of magnets.

Optionally the at least one magnetic sensor comprises a plurality of magnetic sensors distributed in the axial direction.

The movable member may be arranged to move along an axis that is substantially straight. Alternatively the axis may be curved or part-curved.

The movable member may be a piston disposed in a housing for reciprocal movement along an axis, the housing having a wall with an internal surface, the piston having first and second axially spaced end surfaces, at least a first chamber defined between one of the first and second end surfaces and the internal surface of the wall for receipt of actuating fluid, the magnetic field generator being coupled to the piston so as to move with the piston along said axis, and the magnetic sensor arrangement being arranged to determine the axial position of the magnetic field generator relative to the housing. In this case, the position sensing assembly may be a linear actuator.

The movable member may also comprise a piston rod coupled to the piston such that it moves with the piston. The magnetic field generator may be coupled to the piston rod (and therefore to the piston) so as to move axially with the piston rod (and therefore the piston).

The movable member may be a float arranged such that, in use, it is movable in the axial direction in dependence on the level of a fluid in which the float is located. The axial direction may be substantially vertical. The position sensing assembly may comprise a fluid housing for containing the fluid. The fluid housing may comprise an access port, through which the magnetic sensor housing passes.

All of the features described herein may be combined with any of the above aspects, in any combination.

A specific embodiment of the present invention will now be described, by way of example only, with reference to the accompanying drawings in which:

FIG. 3A shows an end view of the magnetic field generator shown in FIG. 3;

FIG. 3B shows a cross-sectional view of the magnetic field generator of FIG. 3A, taken along the line B-B in FIG. 3A;

FIG. 4A shows an end view of the magnetic field generator shown in FIG. 4;

FIG. 4B shows a cross-sectional view of the magnetic field generator of FIG. 4A, taken along the line B-B in FIG. 4A;

FIG. 6A shows an end view of the magnetic field generator shown in FIG. 6;

FIG. 6B shows a cross-sectional view of the magnetic field generator of FIG. 6A, taken along the line B-B in FIG. 6A;

FIG. 7 shows a perspective view of a magnetic field generator of the linear actuator of FIG. 1, according to a sixth embodiment of the first aspect of the present invention;

FIG. 7A shows an end view of the magnetic field generator shown in FIG. 7;

FIG. 7B shows a cross-sectional view of the magnetic field generator of FIG. 7A, taken along the line B-B in FIG. 7A;

FIG. 8A shows an end view of the magnetic field generator shown in FIG. 8;

FIG. 8B shows a cross-sectional view of the magnetic field generator of FIG. 8A, taken along the line B-B in FIG. 8A;

FIG. 8C shows a schematic view illustrating the different lengths of the magnets used in the magnetic field generator shown in FIG. 8;

FIG. 9A shows an end view of the magnetic field generator shown in FIG. 9;

FIG. 9B shows a cross-sectional view of the magnetic field generator of FIG. 9A, taken along the line B-B in FIG. 9A;

Figure 1:
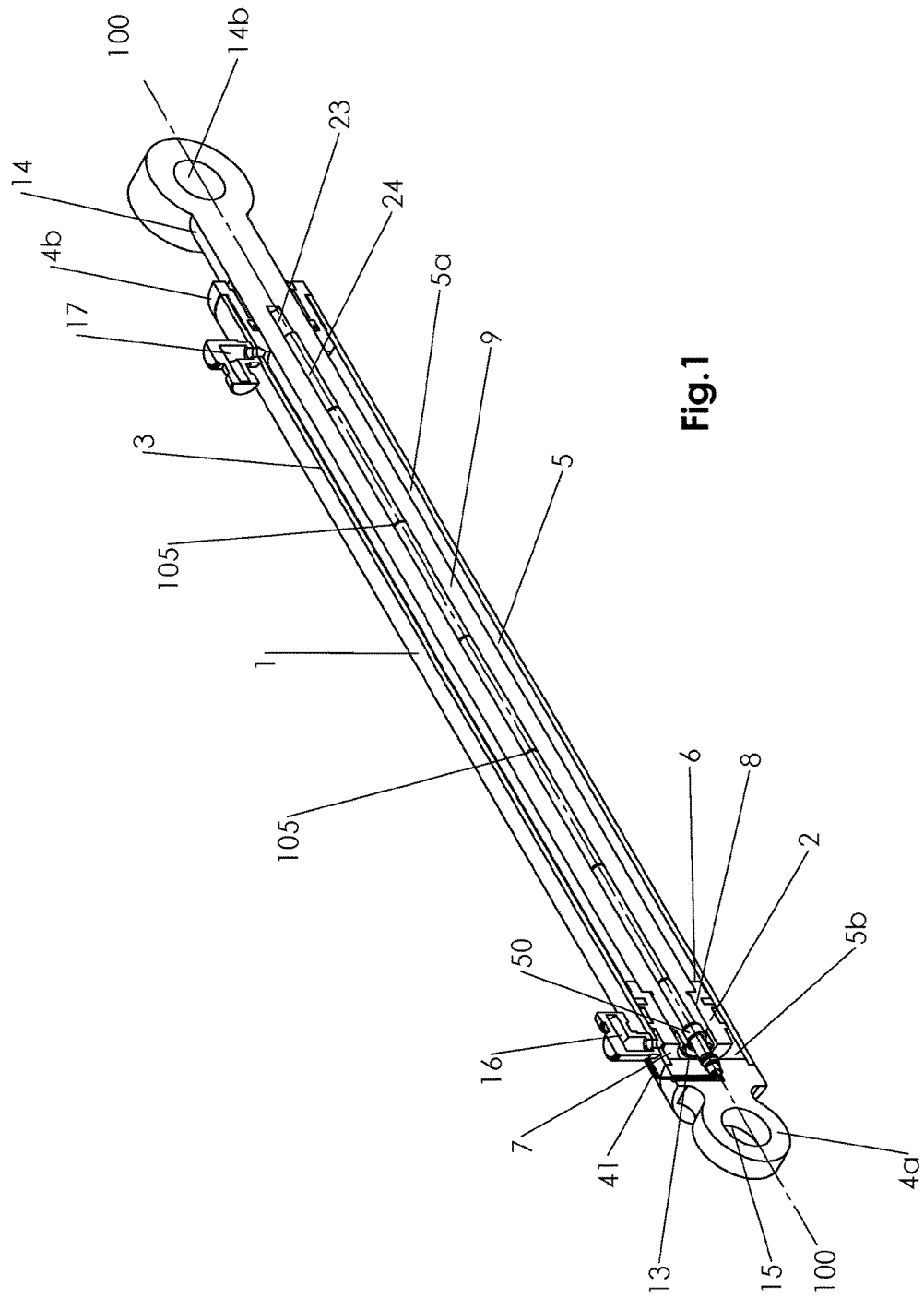
FIG. 1 shows a cutaway perspective view of a linear actuator according to a first embodiment of the second aspect of the present invention, with a longitudinal half of the linear actuator omitted for illustrative purposes.
Figure 14:
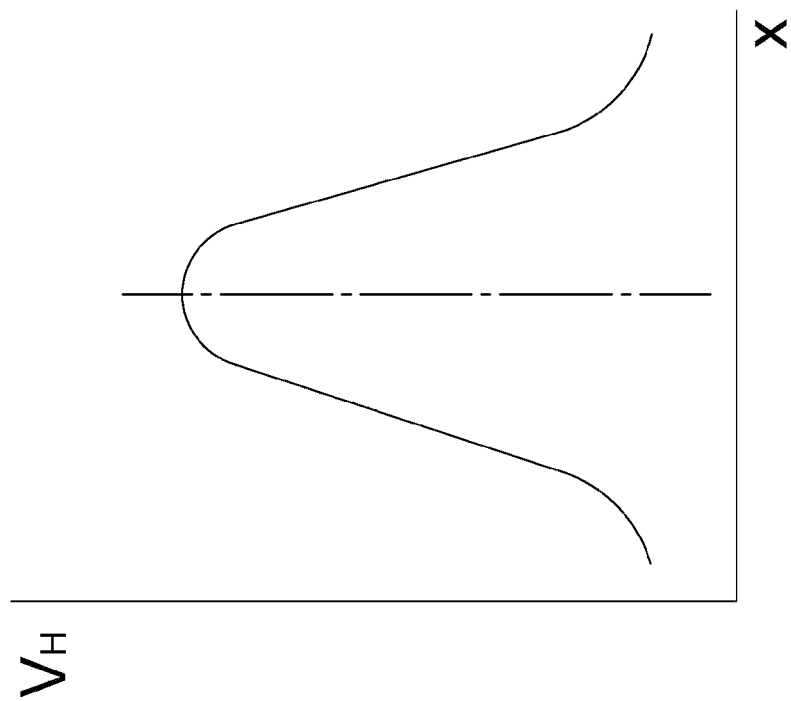
Figure 15:
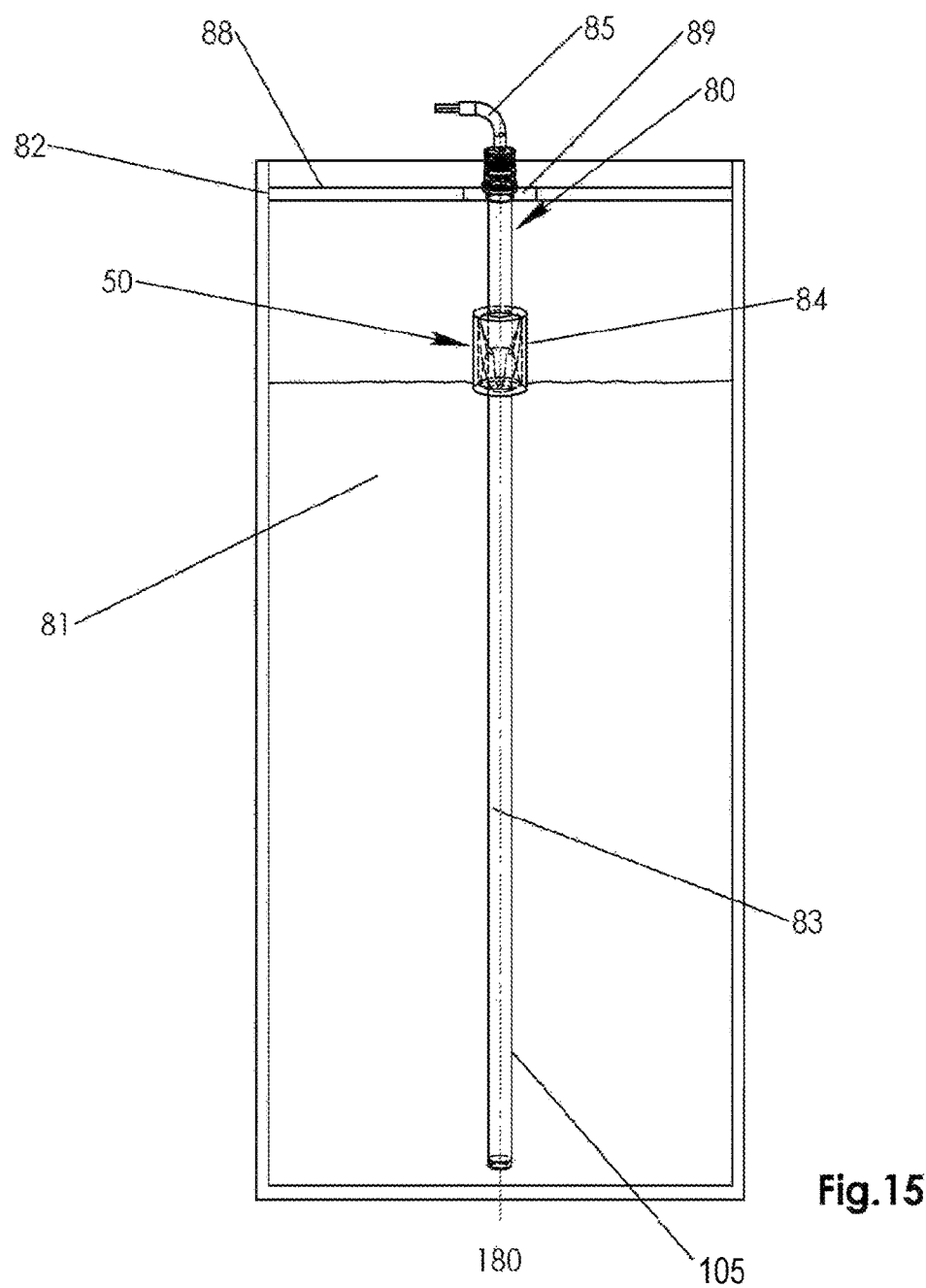

FIG. 14 shows a representative graph of the variation of Hall Effect voltage ($V_H$) generated, by the magnetic field generator shown in the embodiments of FIGS. 2A to 12C, across a Hall-effect sensor of the magnetic sensor arrangement of the linear actuator of FIG. 1, with axial position (x) across the magnetic field, and FIG. 15 shows a position sensing assembly in the form of a fluid level sensor assembly according to a second embodiment of the second aspect of the present invention.

Referring to FIG. 1, there is shown a position sensing assembly in the form of hydraulic linear actuator comprising a housing in the form of a cylinder 1 and a reciprocal piston 2. The cylinder 1 extends along a longitudinal axis 100. The cylinder 1 has first and second end fittings 4a, 4b so as to define an internal chamber 5 in which the piston 2 is slidably disposed to reciprocate along the longitudinal axis 100.

The piston 2 is cylindrical with first and second end surfaces 6, 7 penetrated by a central bore 8. The piston 2 is made of a ferromagnetic material, for example magnetic carbon, steel or iron.

The piston 2 is concentrically mounted on a piston rod 9 towards a first end of the rod 9 and is fixed axially relative to the rod 9. A first end 13 of the piston rod 9 is secured to the piston 2. A second end 14 of the piston rod 9 projects outside the cylinder though a bore in the second end fitting 4b and terminates in an eyelet 14b for connection to a first component. The first end fitting 4a has an eyelet 15 for connection to a second component, the first and second components designed to be movable relative to one another by the actuator.

The piston 2 serves to divide the chamber 5 into two variable volume sections 5a, 5b, defined between the first and second end surfaces 6, 7 of the piston 2 and an inner surface of the wall 3 of the cylinder 1 for receipt of hydraulic fluid. Ports 16, 17 penetrate the wall 3 axially inboard of each end fitting 4a, 4b and allow hydraulic fluid to be delivered or removed so as to alter the fluid pressure within the respective chamber sections 5a, 5b and effect movement of the piston 2 within the cylinder 1.

A cylindrical bore 23 is provided in the piston rod 9 that extends in the direction of the longitudinal axis 100. The bore 23 extends from the first end 13 of the piston rod 9 towards the second end 14 of the piston rod 9 along the longitudinal axis 100, terminating axially inboard of the second end 14 of the piston rod 9.

A magnetic sensor arrangement in the form of a plurality of Hall-effect sensors 105 are arranged in a linear array in a magnetic sensor housing in the form of a tube 24 provided in the bore 23 in the piston rod 9. The tube 24 is cylindrical and extends along the longitudinal axis 100 of the cylinder 1. The tube 24 is fixed axially relative to the cylinder 1. In order to fix the tube 24 to the cylinder 1, the first end of the tube 24 is fixedly attached to the first end fitting 4a. The Hall-effect sensors 105 are distributed along the length of the tube 24 in the axial direction 100.

A magnetic field generator 50 is received within the bore 24 in the piston rod 9 towards the first end of the piston rod 9. In this respect, the magnetic field generator 50 is also located within the bore 8 in the piston 2.

The magnetic field generator 50 is coupled to the piston 2 so as to move with the piston 2 along the longitudinal axis 100. In this respect, the magnetic field generator 50 is housed between a radially inner surface of the piston rod 9 and a radially outer surface of the tube 24. A radially outer surface of the magnetic field generator 50 is fixedly attached to the radially inner surface of the piston rod 9 such that it moves axially with the piston rod 9, and therefore the piston 2, with a radially inner surface of the magnetic field generator 50 sliding over the radially outer surface of the tube 24.

The Hall-effect sensors 105 and the magnetic field generator 50 are arranged such that as the magnetic field generator 50 slides with the piston 2, the magnetic field produced by the magnetic field generator 50 is sensed by each of the Hall-effect sensors in turn, so as to sense the position of the magnetic field generator 50, and therefore of the piston 2, relative to the cylinder 1, along the longitudinal axis 100.

In this respect, a connecting cable 41 passes from the tube 24 through a bore in the first end fitting 4a to a suitable electronic circuit arranged to output the axial position of the piston 2 and/or piston rod 9 from the voltages produced across the Hall-effect sensors 105. This output axial position may then be used by a suitable control system.

Figure 2:
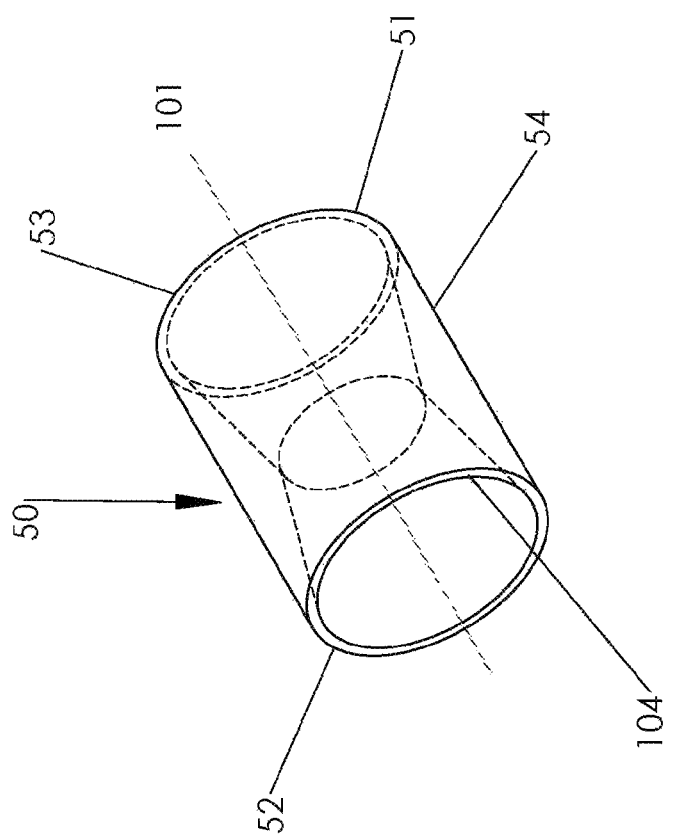
FIG. 2 shows a perspective view of a magnetic field generator of the linear actuator of FIG. 1, according to a first embodiment of the first aspect of the present invention.
Figure 2B:
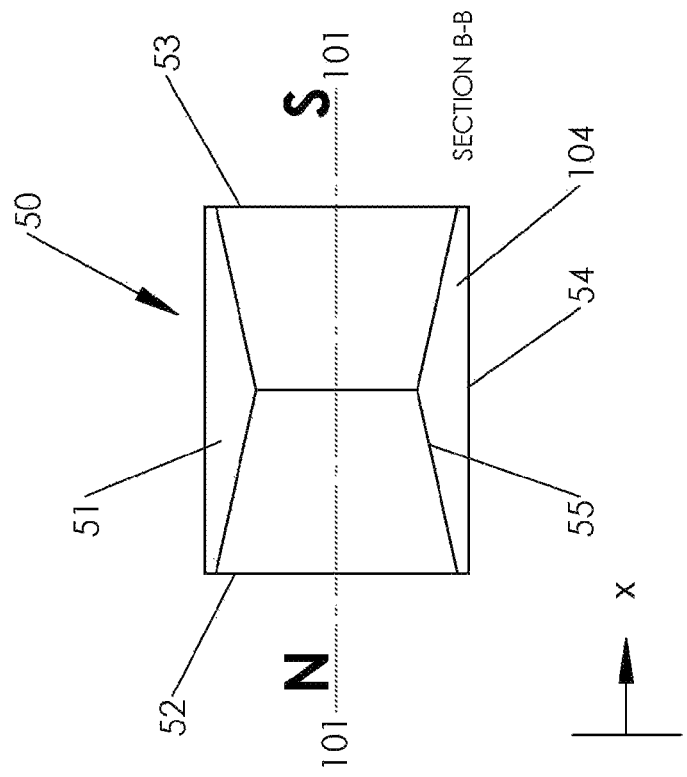
FIG. 2B shows a cross-sectional view of the magnetic field generator of FIG. 2A, taken along the line B-B in FIG. 2A.
Figure 2A:
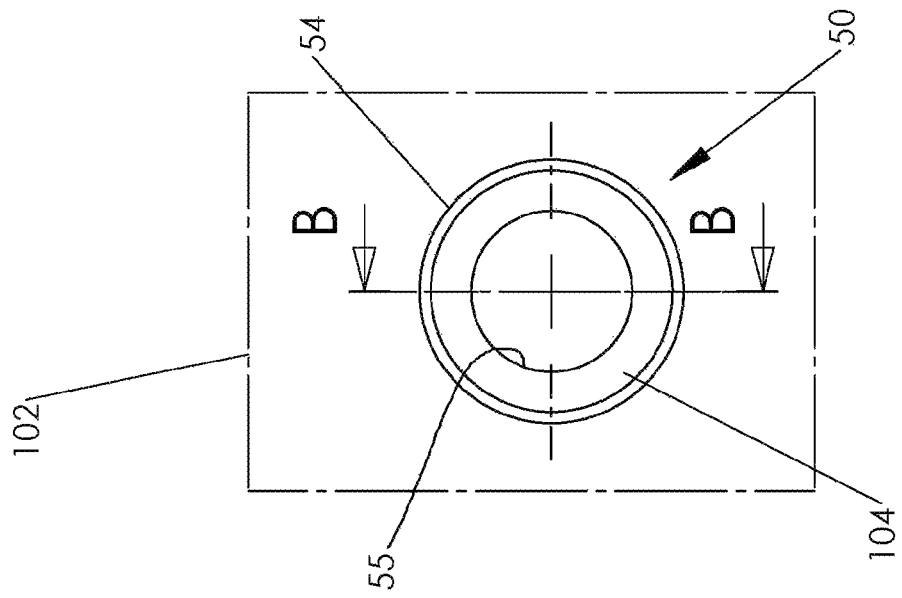
FIG. 2A shows an end view of the magnetic field generator shown in FIG. 2.

Referring to FIGS. 2, 2A and 2B, there is shown a first embodiment of the magnetic field generator 50. The magnetic field generator 50 comprises a single magnet 51, formed by an annular wall 104 of magnetic material.

The annular wall 104 is generally elongate extending from a first end 52 to a second end 53 along a longitudinal axis 101. The first end 52 forms a North pole and the second end 53 forms a South pole (as shown in FIG. 2B).

The annular wall 104 extends in a thickness direction from a radially outer surface 54 to a radially inner surface 55. The annular wall 104 extends circumferentially substantially around the longitudinal axis 101.

The radially outer surface 54 has a substantially circular cross sectional shape that is substantially centred on the longitudinal axis 101 of the magnet 51 and has a substantially constant radius across the axial length of the magnet 51.

The radially inner surface 55, has a substantially circular cross-sectional shape about the axis 101 (which varies in radius with axial position—see below).

The wall of magnetic material 104 linearly increases in thickness from its first and second ends 52, 53, to the midpoint 56 along its length between its first and second ends 52, 53. In this respect, as the radially inner surface 55 extends from the first and second ends 52, 53 of the magnet 51 to the midpoint 56 along its length between its first and second ends 52, 53, the radial distance between the radially inner surface 55 and the axis 101 decreases linearly. Accordingly, the distance in the radial direction between diametrically opposite points on the radially inner surface 55 decreases.

As stated above, the radially outer surface 54 of the annular wall 104 is fixedly attached to the radially inner surface of the piston rod 9 such that it moves axially with the piston rod 9, and therefore the piston 2, with the radially inner surface 55 of the annular wall 104 sliding over the radially outer surface of the tube 24.

The longitudinal axis 101 of the magnet 51 is coincident and substantially parallel with the longitudinal axis 100 of the cylinder 1.

Figure 13:
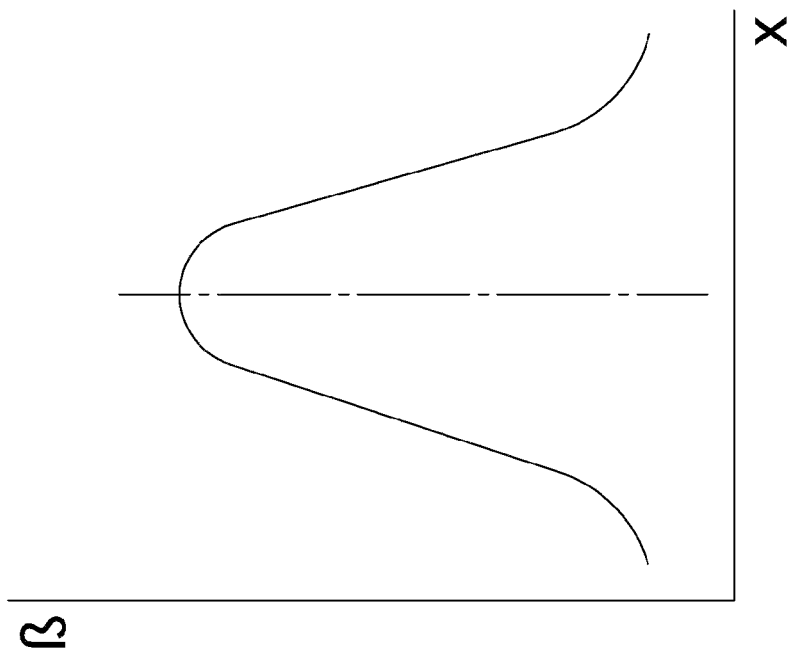
FIG. 13 shows a representative graph of the variation of the magnetic flux density ($\beta$) of the magnetic field generated by the magnetic field generator shown in the embodiments of FIGS. 2A to 12C with axial position (x) across the magnetic field.

In this arrangement, the amount of magnetic material of the magnet 51 in a plane 102 substantially perpendicular to the axis 100, 101 varies with the axial position of the plane such that the magnet 51 produces a magnetic field with a magnetic flux density that changes substantially continuously in magnitude in the axial direction substantially along the length of magnet 51 in the axial direction 100, 101 (as shown represented in FIG. 13).

In this regard, the amount of magnetic material of the magnet 51 in a plane 102 substantially perpendicular to the axis 100, 101 varies with the axial position of the plane 102 by a continuous change in the amount of magnetic material in said plane as the axial position of the plane varies, substantially along the length of the magnet 51 in the axial direction.

This allows the magnetic field produced by the magnetic field generator 50 to be relatively long, without the magnetic field having a section of substantially no change in magnitude of magnetic flux density, for example at a central area between the magnetic poles of the magnet 51.

In this respect, because the magnetic flux density changes substantially continuously in magnitude in the axial direction 101, substantially along the axial length of the magnetic field, the Hall-effect voltage produced on the Hall-effect sensors also changes substantially continuously in magnitude in the axial direction 101 substantially along the length of the magnetic field in the axial direction 101 (as shown represented in FIG. 14). Accordingly, the resolution of the sensed axial positions of the magnetic field generator 50, and therefore of the piston 2, is significantly increased (relative to if the magnetic field did not vary substantially continuously in the axial direction). This allows the magnetic sensor arrangement to use relatively few Hall-effect sensors, which saves cost.

In addition, this allows the diameter of the magnetic field generator 50 to be relatively small, as compared to if an axially uniform magnet was used and the diameter of the axially uniform magnet increased so as to provide a magnetic field of a similar length. Accordingly, this allows the bore 8 in the piston 2 to be of a relatively small diameter, thereby maintaining the structural integrity of the piston 2.

FIGS. 3 to 12C show different embodiments of the magnetic field generator 50. In each of the following embodiments, the same reference numerals will be used for features in common with the first embodiment.

Figure 3:
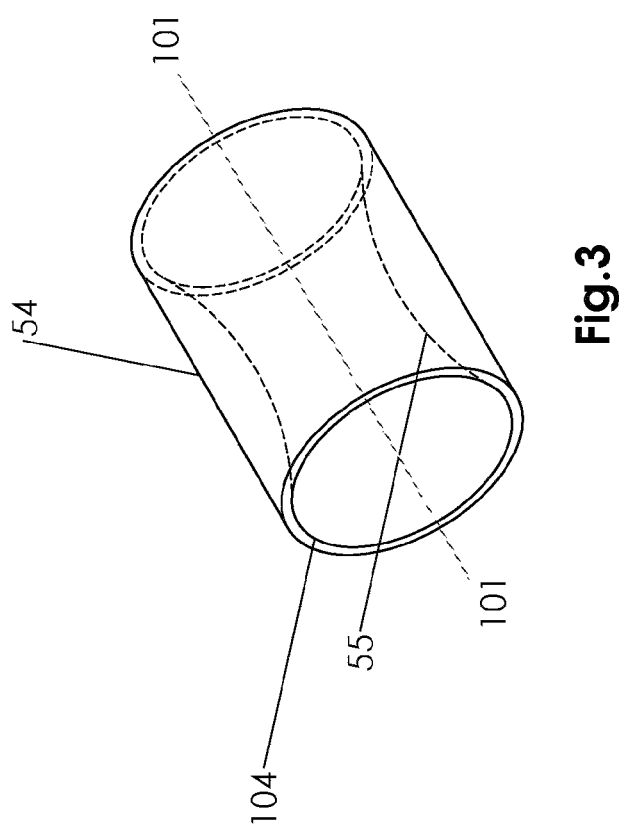
FIG. 3 shows a perspective view of a magnetic field generator of the linear actuator of FIG. 1, according to a second embodiment of the first aspect of the present invention.

Referring now to FIGS. 3, 3A and 3B, there is shown a second embodiment of the magnetic field generator 50. The magnetic field generator 50 of the second embodiment is identical to that of the first embodiment, except in that the wall of the magnetic material 104 non-linearly increases in thickness from its first and second ends 52, 53, to the midpoint 56 along its length between its first and second ends 52, 53. In this regards, the radially outer surface 54 has a substantially constant radius across the axial length of the wall 104 and the radially inner surface 55 non-linearly varies in radius with axial position to produce said variation in thickness.

Figure 4:
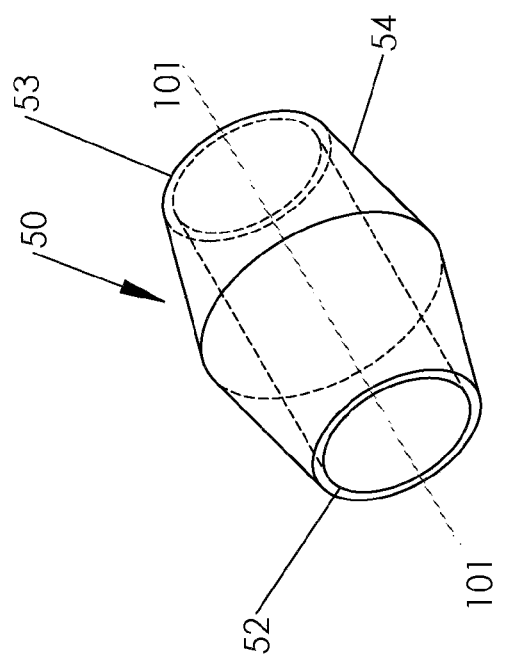
FIG. 4 shows a perspective view of a magnetic field generator of the linear actuator of FIG. 1, according to a third embodiment of the first aspect of the present invention.

Referring now to FIGS. 4, 4A and 4B, there is shown a third embodiment of the magnetic field generator 50. As with the first embodiment, the annular wall 104 linearly increases in thickness from its first and second ends 52, 53 of the magnet 51 to the midpoint 56 along its length between its first and second ends 52, 53. The magnetic field generator 50 of this embodiment is identical to that of the first embodiment except in that the arrangement of the radially inner and outer surfaces 55, 54 is reversed, i.e. the radially inner surface 55 has a substantially constant radius across the axial length of the wall 104 and the radially outer surface 54 varies in radius with axial position to produce said variation in thickness.

Figure 5:
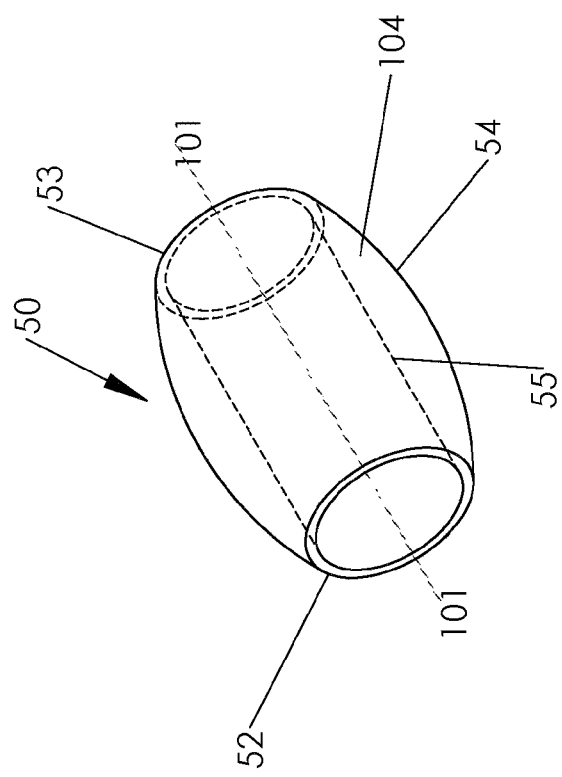
FIG. 5 shows a perspective view of a magnetic field generator of the linear actuator of FIG. 1, according to a fourth embodiment of the first aspect of the present invention.
Figure 5B:
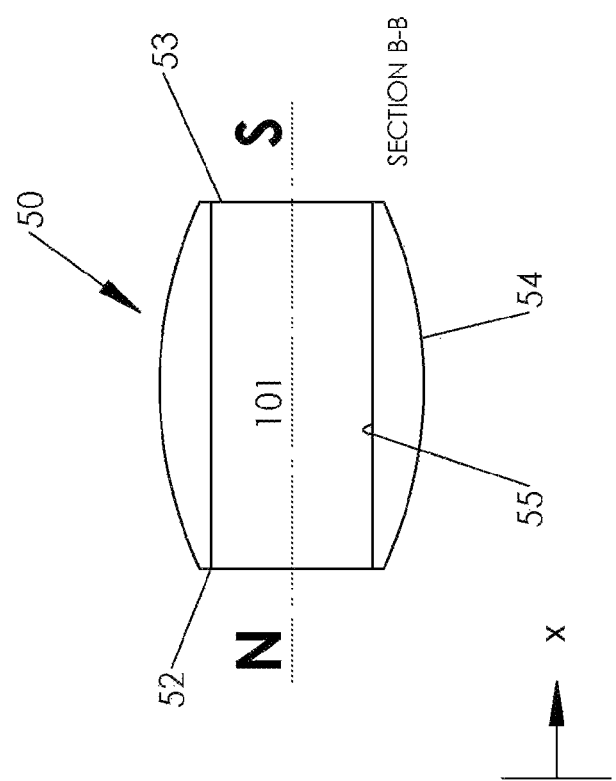
FIG. 5B shows a cross-sectional view of the magnetic field generator of FIG. 5A, taken along the line B-B in FIG. 5A.
Figure 5A:
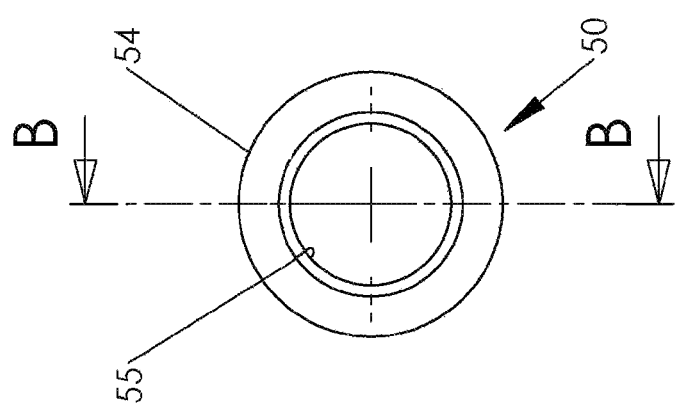
FIG. 5A shows an end view of the magnetic field generator shown in FIG. 5.

Referring now to FIGS. 5, 5A and 5B, there is shown a fourth embodiment of the magnetic field generator 50. As with the second embodiment, the annular wall 104 non-linearly increases in thickness from its first and second ends 52, 53 to the midpoint 56. The magnetic field generator 50 of this embodiment is identical to that of the second embodiment except in that the arrangement of the radially inner and outer surfaces 55, 54 is reversed, i.e. the radially inner surface 55 has a substantially constant radius across the axial length of the wall 104 and the radially outer surface 54 varies in radius with axial position to produce said variation in thickness.

Figure 6:
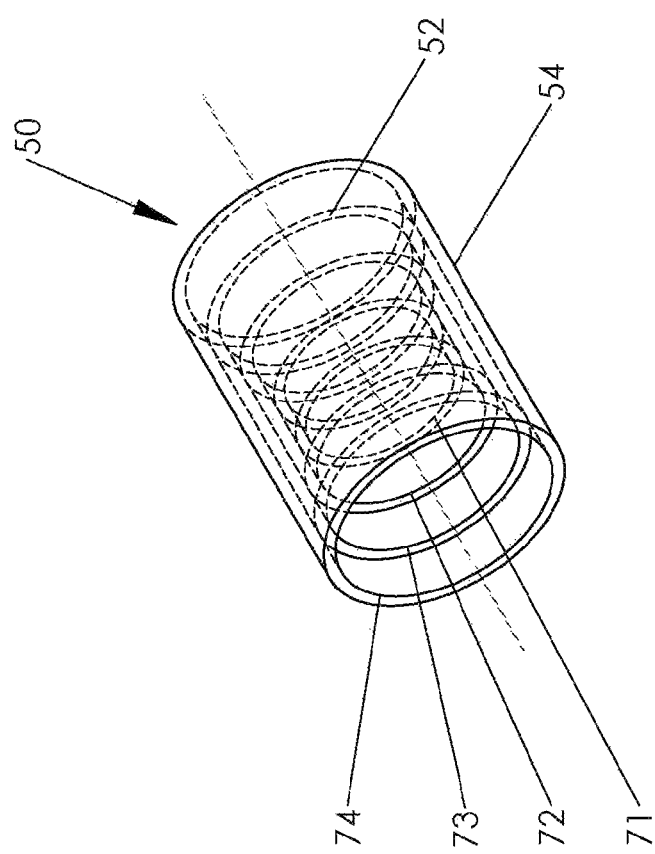
FIG. 6 shows a perspective view of a magnetic field generator of the linear actuator of FIG. 1, according to a fifth embodiment of the first aspect of the present invention.

Referring now to FIGS. 6, 6A and 6B, there is shown a fifth embodiment of the magnetic field generator 50. In this embodiment, the magnetic field generator 50 comprises a plurality of magnets. Specifically, the magnetic field generator 50 comprises first, second, third and fourth magnets 71, 72, 73, 74.

The magnetic field generator 50 extends from a first end 52 to a second end 53 along a longitudinal axis 103. Each magnet 71, 72, 73, 74 is a substantially hollow cylindrical magnet. Each magnet 71, 72, 73, 74 extends from a first end to a second end about the longitudinal axis 103 and has a radially outer surface 54 and a radially inner surface 55 that have a substantially circular cross-sectional shape that is substantially centred on the longitudinal axis 103.

The magnets 71, 72, 73, 74 are nested concentrically together. In this respect, the first magnet 71 is received within the second magnet 72 which is itself received within the third magnet 73, which is received within the fourth magnet 74. The radially outer surface of the first magnet 71 is in contact with the radially inner surface of the second magnet 72, the radially outer surface of the second magnet 72 is in contact with the radially inner surface of the third magnet 73 and the radially outer surface of the third magnet 73 is in contact with the radially inner surface of the fourth magnet 74.

The magnets 71, 72, 73, 74 have different lengths in said axial direction 103. Specifically, the first magnet 71 is shorter than the second magnet 72, in the axial direction 103, the second magnet 72 is shorter in length, in the axial direction 103, than third magnet 73 and the third magnet 73 is shorter in length, in the axial direction 103, than fourth magnet 74.

The first, second and third magnets 71, 72, 73 are axially located such that the midpoints along their axial lengths are substantially aligned with the midpoint 56 along the axial length of the fourth magnet 74. The first and second ends 52, 53 of the magnetic field generator 50 are defined by the first and second ends of the fourth magnet 74.

The magnets 71, 72, 73, 74 together define a radially inner stepped surface 55 and a radially outer surface 54.

The radially outer surface 54 is a radially outer surface of the fourth magnet 74 and has a substantially circular cross sectional shape that is substantially centred on the longitudinal axis 103. The radially outer surface 54 has a substantially constant radius substantially along the axial length of the magnetic field generator 50.

The stepped radially inner surface 55 has a substantially circular cross-sectional shape about the axis 103. As the radially inner surface 55 extends from the first and second ends 52, 53 of the of the magnetic field generator 50 to the midpoint 56 between the first and second ends 52, 53, the radial distance between the radially inner surface 55 and the axis 103 decreases in a step-wise manner.

Referring now to FIGS. 7, 7A and 7B, there is shown a sixth embodiment of the magnetic field generator 50. This embodiment is identical to the fifth embodiment except in the ordering of the lengths of the magnets 71, 72, 73, 74. In this regard, the fourth magnet 74 is shorter than the third magnet 73, in the axial direction 103, the third magnet 73 is shorter in length, in the axial direction 103, than second magnet 72 and the second magnet 72 is shorter in length, in the axial direction 103, than the first magnet 71.

As with the preceding embodiments, in each of the embodiments shown in FIGS. 6 to 7*b* the amount of magnetic material in a plane 102 substantially perpendicular to the axis 103 varies with the axial position of the plane such that the magnetic field generator 50 produces a magnetic field with a magnetic flux density that changes substantially continuously in magnitude in the axial direction substantially along the length of magnet 51 in the axial direction 100, 101 (as shown represented in FIG. 13).

In this regard, the amount of magnetic material of the magnet 51 in a plane 102 substantially perpendicular to the axis 103 varies with the axial position of the plane 102 by a plurality of discrete changes in the amount of magnetic material in said plane as the axial position of the plane varies.

This provides the advantages described above in relation to the preceding embodiments.

Figure 8:
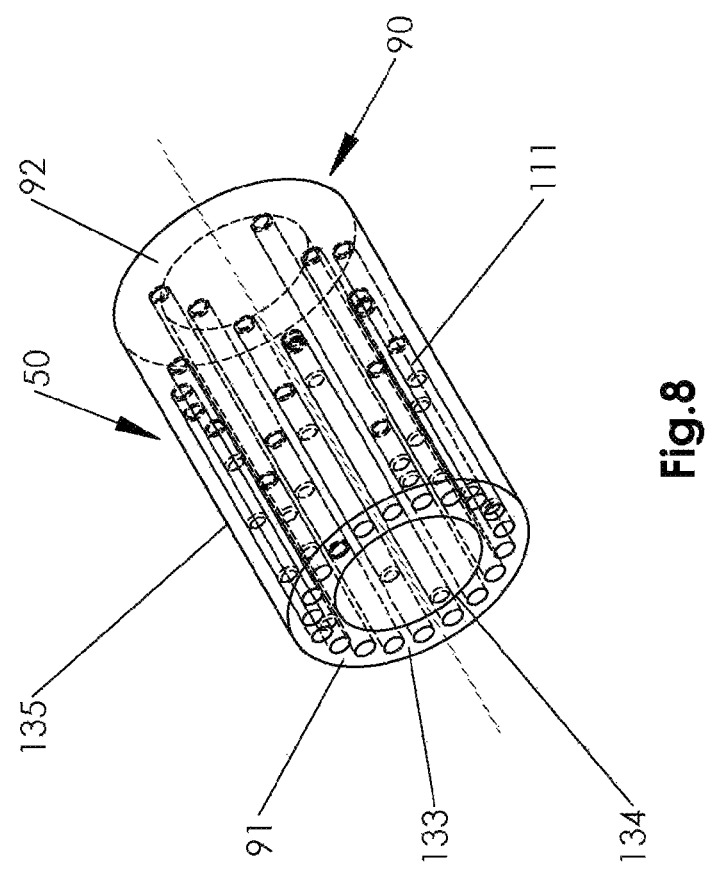
FIG. 8 shows a perspective view of a magnetic field generator of the linear actuator of FIG. 1, according to a seventh embodiment of the first aspect of the present invention.

Referring now to FIGS. 8 to 8C, there is shown a seventh embodiment of the magnetic field generator 50. In this embodiment, the magnetic field generator 50 comprises a holder 90 of magnetically insulating material. The holder 90 may be made from any suitable magnetically insulating material, such as a suitable plastics material, aluminium, brass, nylon or the like.

The holder 90 comprises a wall 133 of magnetically insulating material that has the general shape of a hollow cylinder, extending from a first end 91 to a second end 92 about a longitudinal axis 110 (see FIG. 8*b*). The wall 133 has a circular cross-sectional shape that is substantially centred on the longitudinal axis 110. The wall 133 extends in a thickness direction from a radially inner surface 134 to a radially outer surface 135.

The radially outer surface 135 of the wall 133 is fixedly attached to the radially inner surface of the piston rod 9, so as to move axially with the piston rod 9 (and therefore the piston 2).

The magnetic field generator 50 comprises a plurality of sets 111 of magnets 95, 96, 97, 98. Each set 111 of magnets is substantially identical. Each set 111 of magnets is disposed within the thickness of the wall 133, with the sets 111 being distributed circumferentially about the longitudinal axis 110.

In the described embodiment each set of magnets consists of four magnets 95, 96, 97, 98.

Each of the magnets 95, 96, 97, 98 is a substantially solid cylindrical magnet, extending along a longitudinal axis that is substantially parallel to the longitudinal axis 110. In each set 111, a first magnet 98 of the set is shorter than a second magnet 97 of the set, the second magnet 97 of the set is shorter than a third magnet 96 of the set and the third magnet 96 of the set is shorter than a fourth magnet 95 of the set.

Each magnet is received within a respective cylindrical bore 93 in the wall 133 that extends along a longitudinal axis that is substantially parallel to the longitudinal axis 110 and is spaced radially from said axis 110. The magnets 95, 96, 97, 98 in each set are distributed in the circumferential direction. The magnets 95, 96, 97, 98 in each set are located at substantially the same radius from the axis 110. Each set of magnets are located at substantially the same radius from the axis 110. Accordingly, each magnet of the magnetic field generator is located at substantially the same radius from the axis 110.

Each magnet 95, 96, 97, 98 is separated from each other magnet 95, 96, 97, 98 by the surrounding wall 133 of magnetically insulating material. In addition, the longitudinal ends of each magnet 95, 96, 97, 98 are covered by respective ends of the wall 133 of magnetically insulating material. Each magnet 95, 96, 97, 98 is substantially enclosed by the magnetically insulating material.

In each set 111, the first magnet 98 is centred along the axial length of the second magnet 97, the second magnet 97 is centred along the axial length of the third magnet 96 and the third magnet is centred along the axial length of the fourth magnet 95.

The circumferential order of the magnets 95, 96, 97, 98, of each set, in the clockwise direction, when viewed in the direction of FIG. 8*a*, is the first magnet 98, followed by the second magnet 97, followed by the third magnet 96, followed by the fourth magnet 95. Accordingly, the first magnet 98 of each set is circumferentially adjacent to the fourth magnet 95 of an adjacent set.

Due to the arrangement of said magnets of differing lengths within the holder 90, the amount of magnetic material in a plane substantially perpendicular to the axis 110 varies with the axial position of the plane such that a magnetic field is produced that has a magnetic flux density that changes substantially continuously in magnitude in the axial direction substantially along the length of the magnetic field generator 50.

As with the preceding embodiments, this reduces the number of Hall-effect sensors required, and allows the diameter of the magnetic field generator to be relatively small.

Furthermore, because each magnet 95, 96, 97, 98 is substantially enclosed by the magnetically insulating material, the magnetic field generator 50 has a magnetic flux density distribution that is substantially symmetrical in the axial direction, and increases the length of the magnetic field.

Figure 9:
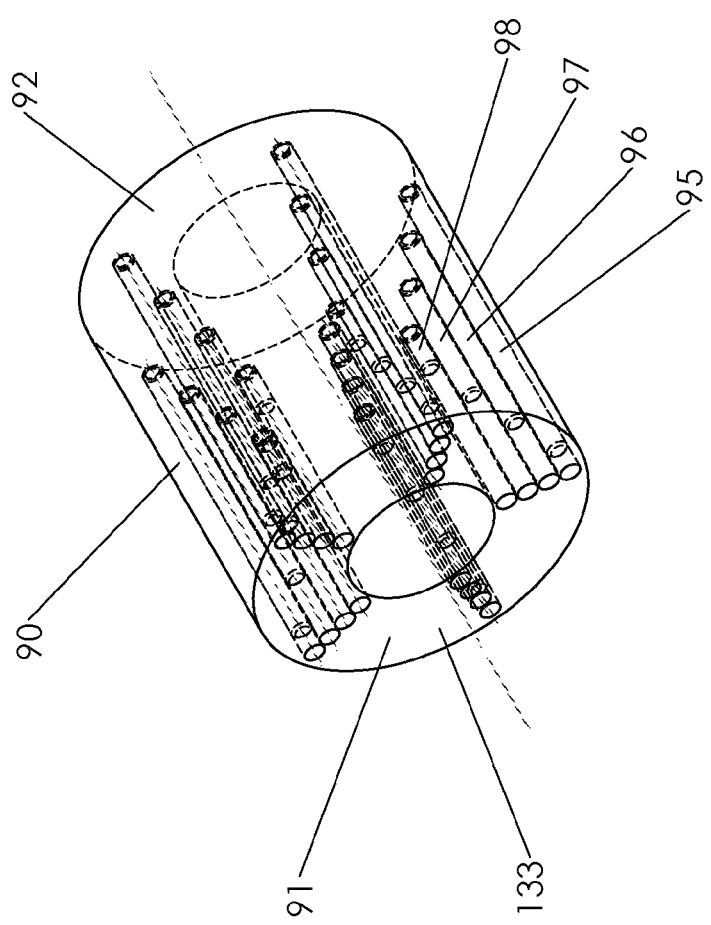
FIG. 9 shows a perspective view of a magnetic field generator of the linear actuator of FIG. 1, according to an eighth embodiment of the first aspect of the present invention.

Referring now to FIGS. 9 to 9B, there is shown an eighth embodiment of the magnetic field generator 50. The magnetic field generator 50 of this embodiment is identical to the magnetic field generator of the previous embodiment (shown in FIG. 8, 8A to 8C) except in that the magnets 95, 96, 97, 98 of each set 111 are substantially aligned in the radial direction and increase in length with increasing radial distance from the longitudinal axis 110. The sets 111 are distributed in the circumferential direction.

In this respect, in each set 111, the first magnet 98 is provided radially inwardly of the second magnet 97, the second magnet 97 is provided radially inwardly of the third magnet 96 and the third magnet 96 is provided radially inwardly of the fourth magnet 95.

Alternatively the magnets 95, 96, 97, 98 may be arranged such that they decrease in length with increasing radial distance from the longitudinal axis 110.

Figure 10:
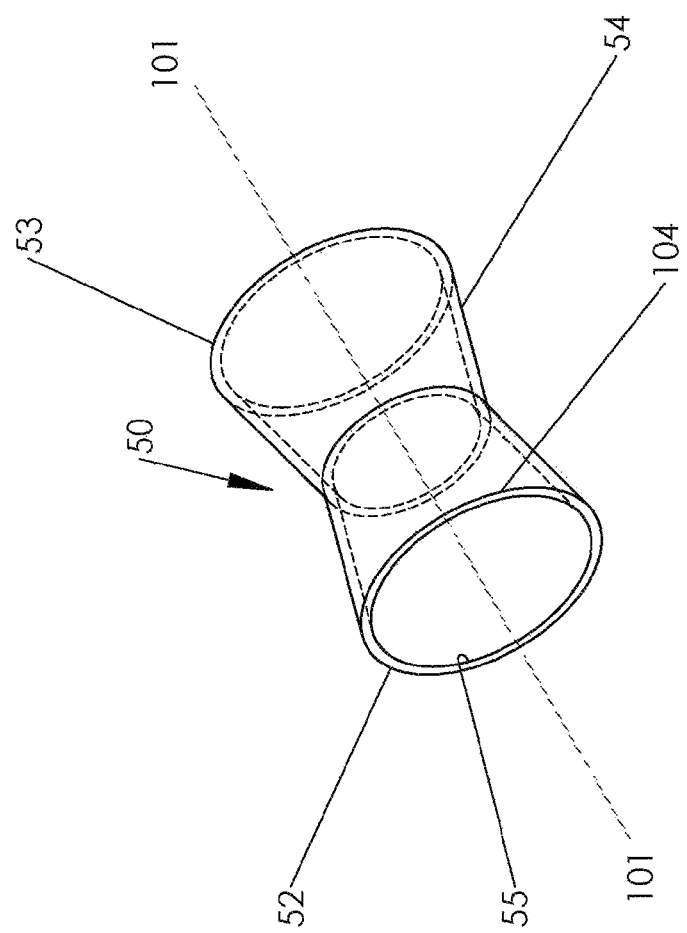
FIG. 10 shows a perspective view of a magnetic field generator of the linear actuator of FIG. 1, according to a ninth embodiment of the first aspect of the present invention.
Figure 10B:
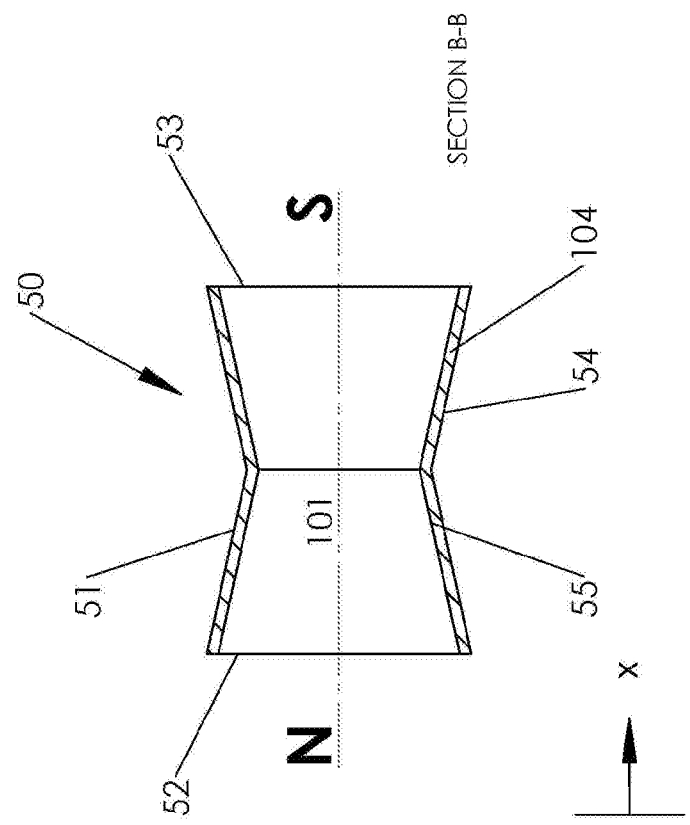
FIG. 10B shows a cross-sectional view of the magnetic field generator of FIG. 10A, taken along the line B-B in FIG. 10A.
Figure 10A:
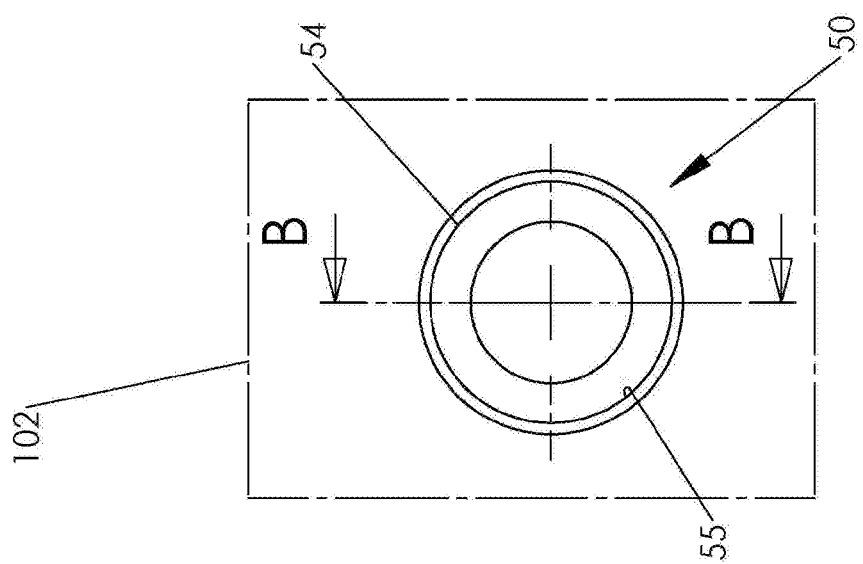
FIG. 10A shows an end view of the magnetic field generator shown in FIG. 10.

Referring now to FIGS. 10 to 10B, there is shown a ninth embodiment of the magnetic field generator 50. The magnetic field generator 50 comprises a single magnet 51. The magnet 51 is generally elongate and comprises an annular wall 104 of magnetic material that extends from a first end 52 to a second end 53 along a longitudinal axis 101. The first end 52 forms a North pole and the second end 53 forms a South pole (as shown in FIG. 10B).

The annular wall 104 extends in a thickness direction from a radially outer surface 54 to a radially inner surface 55. The annular wall 104 has a substantially constant thickness across its axial length.

The radially inner surface 55 has a substantially circular cross-sectional shape that is substantially centred on the axis 101 (although the diameter of the circular cross-section varies with axial position). As the radially inner surface 55 extends from the first and second ends 52, 53 to the midpoint 56, the radial distance between the radially inner surface 55 and the axis 101 decreases linearly, i.e. the distance in the radial direction between diametrically opposite points on the radially inner surface 55 decreases linearly.

The radially outer surface 54 is substantially parallel to the radially inner surface 55.

The spacing of the annular wall 104 of magnetic material and the longitudinal axis 101 is varied with axial position such that the magnet 51 produces a magnetic field with a magnetic flux density that changes substantially continuously in magnitude in the axial direction 101 substantially along the length of the magnet 51 in the axial direction (as shown represented in FIG. 13).

In this arrangement, the amount of magnetic material in a plane substantially perpendicular to the longitudinal axis 101 is substantially constant with the axial position of the plane.

Figure 11:
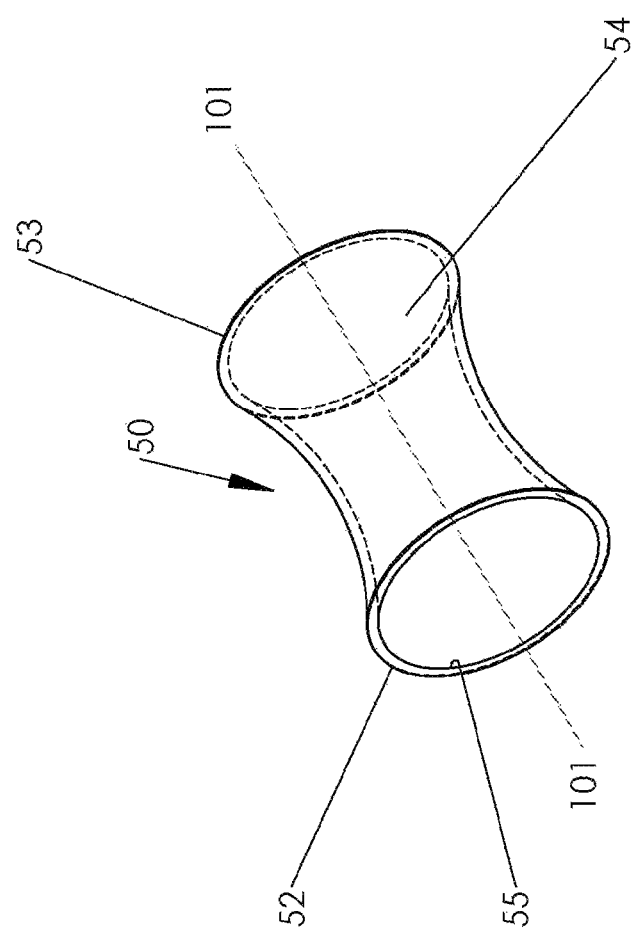
FIG. 11 shows a perspective view of a magnetic field generator of the linear actuator of FIG. 1, according to a tenth embodiment of the first aspect of the present invention.
Figure 11B:
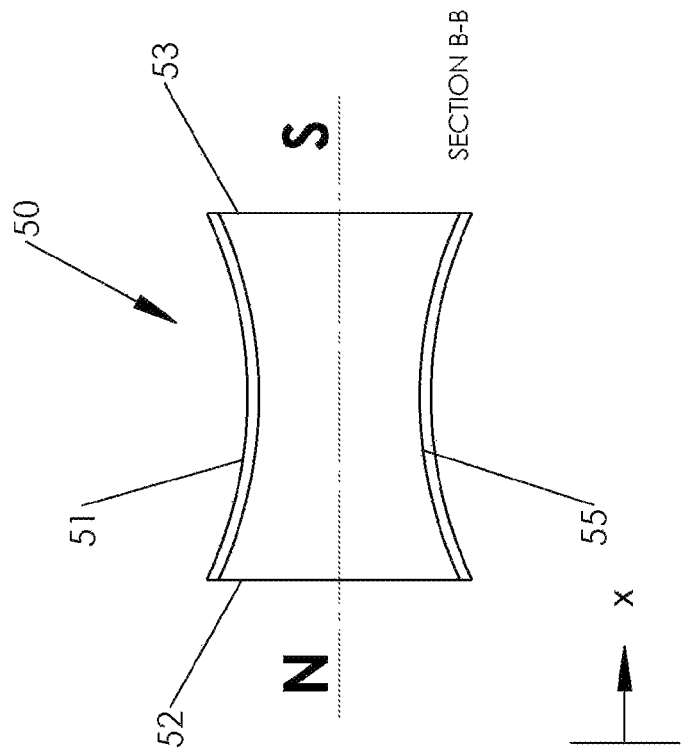
FIG. 11B shows a cross-sectional view of the magnetic field generator of FIG. 11A, taken along the line B-B in FIG. 11A.
Figure 11A:
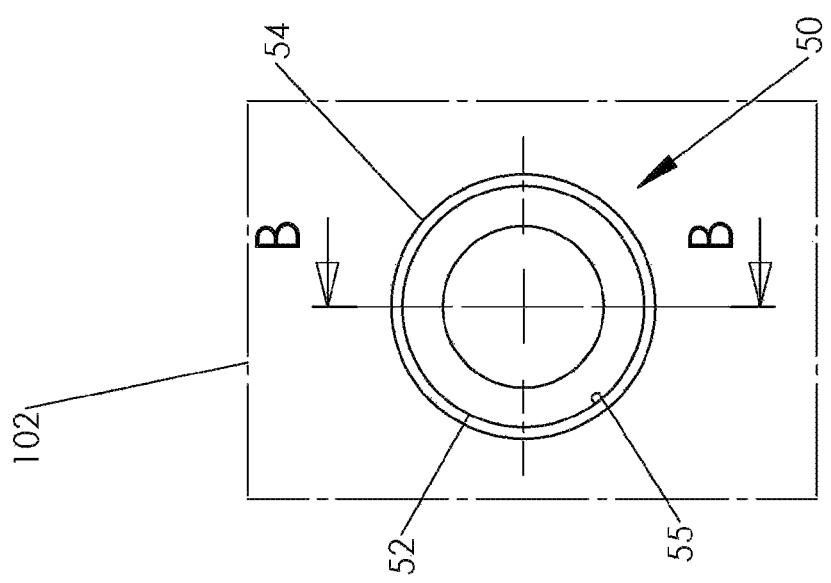
FIG. 11A shows an end view of the magnetic field generator shown in FIG. 11.

Referring now to FIGS. 11 to 11B, there is shown a tenth embodiment of the magnetic field generator 50. This embodiment is identical to the ninth embodiment except in that as the radially inner surface 55 extends from the first and second ends 52, 53 to the midpoint 56, the radial distance between the radially inner surface 55 and the axis 101 decreases non-linearly, i.e. the distance in the radial direction between diametrically opposite points on the radially inner surface 55 decreases non-linearly.

Figure 12A:
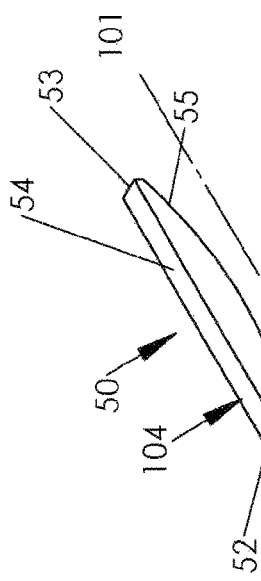
FIG. 12A shows a perspective view a magnetic field generator of the linear actuator of FIG. 1, according to an eleventh embodiment of the first aspect of the present invention.
Figure 12B:
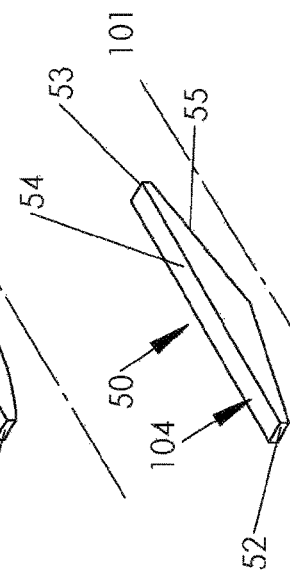
FIG. 12B shows a perspective view a magnetic field generator of the linear actuator of FIG. 1, according to a twelfth embodiment of the first aspect of the present invention.
Figure 12C:
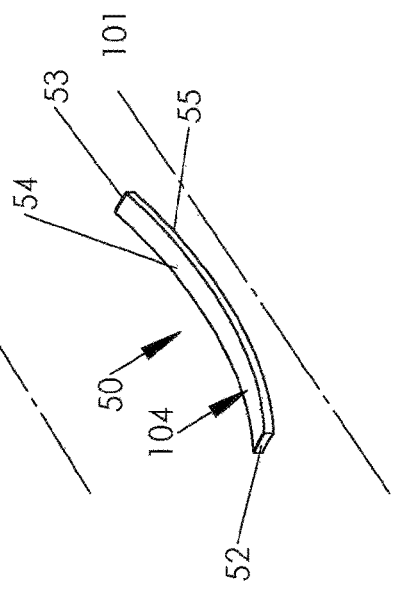
FIG. 12C shows a perspective view a magnetic field generator of the linear actuator of FIG. 1, according to a thirteenth embodiment of the first aspect of the present invention.

Referring to FIGS. 12a to 12c there is shown an eleventh, twelfth and thirteenth embodiment of the magnetic field generator 50. In these embodiments, the magnetic field generator 50 comprises a magnet formed by an elongate strip 104 of magnetic material. The strip 104 is a circumferential section of the magnet of the second, first and tenth embodiments respectively. Alternatively, the strip 104 may be a circumferential section of the magnet of any of the other above described embodiments.

In the described embodiment the strip 104 is pinned to the radially inner surface of the piston rod 9. However, it will be appreciated that any suitable means of attachment may be used.

The strip 104 is attached to the radially inner surface of the piston rod 9 at a circumferential location that produces a maximum Hall output voltage from the Hall sensors 105.

Alternatively, the magnetic field generator 50 may comprise a magnet housing of a magnetically insulating material, which is fixedly attached to the radially inner surface of the piston rod 9, where the strip 104 is fixedly attached to a radially inner surface of the housing of magnetically insulating material.

As with the embodiments shown in FIGS. 2 to 9b, in the embodiments shown in FIGS. 12a and 12b, the amount of magnetic material of the strip 104 in a plane substantially perpendicular to the axis 101 varies with the axial position of the plane such that the magnet produces a magnetic field with a magnetic flux density that changes substantially continuously in magnitude in the axial direction substantially along the length of magnet in the axial direction 101.

As with the embodiment shown in FIGS. 10 to 11b, in the embodiment shown in FIG. 12c the spacing of the strip 104 and the longitudinal axis 101 is varied with axial position such that the magnet 51 produces a magnetic field with a magnetic flux density that changes substantially continuously in magnitude in the axial direction 101 substantially along the length of the magnet 51 in the axial direction (as shown represented in FIG. 13).

In this arrangement, the amount of magnetic material in a plane substantially perpendicular to the longitudinal axis 101 is substantially constant with the axial position of the plane.

For each of the embodiments shown in FIGS. 12a, 12b and 12c, the magnetic field generator 50 may comprise a plurality of said strips 104 distributed circumferentially about the longitudinal axis 101.

In view of the above, it can be seen that the magnetic field generator of each of the above embodiments, allows the number of Hall-effect sensors 105 required by the magnetic sensor arrangement to be reduced, thereby saving cost. The magnetic field generator 50 is also of a relatively small diameter, thereby allowing the diameter of the bore 8 in the piston 2 to be relatively small, which maintains the structural integrity of the piston 2.

It will be appreciated that any of the magnetic field generators 50 of the above described embodiments may be used in the linear actuator of FIG. 1, in place of the magnetic field generator 50 shown in FIG. 1.

Referring to FIG. 15, there is shown a position sensing assembly in the form of a fluid level sensor assembly 80 located in a fluid 81 contained in a fluid housing 82. The fluid housing 82 defines a chamber for containing the fluid. The chamber extends along a longitudinal axis that is substantially vertical. The fluid housing is substantially closed at its upper end by a substantially horizontal upper wall 88. The upper wall 88 is provided with an access port 89. The access port 89 extends through the thickness of the upper wall 88, from an inner surface to an outer surface of the upper wall 88. The access port 89 extends along a longitudinal axis and has a substantially circular cross-sectional shape about the longitudinal axis.

The fluid level sensor assembly 80 comprises a magnetic sensor housing in the form of an elongate cylindrical tube 83 which extends along a longitudinal axis 180. In the described embodiment the tube 83 is oriented such that its longitudinal axis 180 is substantially vertical. An upper end of the tube 83 passes through the access port 89.

A magnetic sensor arrangement in the form of a series of Hall-effect sensors 105 are arranged in a linear array in the tube 83. The tube 83 is fixed axially relative to the fluid housing 82 by any suitable means of attachment. The Hall-effect sensors are distributed along the length of the tube 83 in the axial direction 180.

A float 84 is slidably mounted to the tube 83, for movement along the axis 180 of the tube. The float 84 has a buoyancy, relative to the density of the fluid 81, such that as the level of the fluid 81 rises and falls, the float 84 rises and falls. In this respect, the buoyancy of the float is such that it floats on the surface of the fluid 81.

The magnetic field generator 50 shown in FIGS. 2 to 2B is received within the float 84 and moves with the float 84 in the axial direction 180.

The Hall-effect sensors and the magnetic field generator 50 are arranged such that as the magnetic field generator 50 slides with the float 84, the magnetic field produced by the magnetic field generator 50 is sensed by each of the Hall-effect sensors in turn, so as to sense the position of the magnetic field generator 50, and therefore of the float 84, relative to the tube 83, along the longitudinal axis 180. This sensed position may be used to calculate the depth of the fluid 81.

In this respect, a connecting cable 85 passes from the upper end of the tube 83, through the access port 89 to a suitable electronic circuit arranged to output the axial position of the float 84 from the voltages produced across the Hall-effect sensors.

Since the magnetic field generator 50 is of a relatively small diameter, this allows the float 84 to be of a relatively small diameter. This advantageously allows the access port 89 to be of a relatively small diameter.

It will be appreciated that any of the magnetic field generators of the above described embodiments may be used in this arrangement, in place of the magnetic field generator 50 shown in FIG. 15.

Furthermore, it will be appreciated that the magnetic field generators of the above described embodiments may be used in any other suitable position sensing assembly.

The described and illustrated embodiments are to be considered as illustrative and not restrictive in character, it being understood that only the preferred embodiments have been shown and described and that all changes and modifications that come within the scope of the inventions as defined in the claims are desired to be protected.

For example, in the described embodiments, the linear actuator is a hydraulic linear actuator. Alternatively the hydraulic actuator may be a pneumatic actuator, or any other type of linear actuator.

The piston 2 may be made of a non-ferromagnetic material.

In the first to the fourth, and the ninth and tenth embodiments of the magnetic field generator, the magnet 51 is a single magnet. Alternatively, the magnet 51 may be formed by a plurality of separate magnets arranged to form the shape of the magnet 51.

In the fifth to the eighth embodiments of the magnetic field generator 50, the magnetic field generator 50 comprises a plurality of magnets. Alternatively, the magnetic field generator 50 may comprise a single magnet forming the shape of the plurality of magnets.

In the first to the sixth embodiments the magnet 51 has a radially outer surface 54 and a radially inner surface 55 that have a substantially circular cross-sectional shape. Alternatively, the radially outer surface 54 and/or the radially inner surface 55 may have a different cross-sectional shape, for example rectangular, square, triangular, etc.

In the seventh and eighth embodiments the magnets 95-98 of each set 111 are a substantially solid cylindrical shape. Alternatively, the magnets may have different cross-sectional shapes, for example square, triangular, etc. The magnets within a set 111 may or may not have the same cross-sectional shape. The magnets within a set 111 may or may not be the same diameter.

The magnetic field generator may comprise one or more sets 111 of magnets. Each set 111 of magnets may comprise at least a pair of said magnets of different lengths positioned anywhere within the wall 133. The magnets of a set 111 may be aligned circumferentially or radially within the wall 133. The magnets of a set 111 may be in contact with each other or may be separated from each other by the magnetically insulating material.

In the fifth and sixth embodiments the magnetic field generator 50 comprises a plurality of sets of magnets 71, 72, 73, 74 of different lengths. Each magnet 71, 72, 73, 74 is formed by a single magnet. Alternatively, each magnet 71, 72, 73, 74 may be formed by a plurality of magnet sections joined end to end. This allows shorter magnets to be used, which is advantageous in terms of ease of manufacture.

In this case, the magnets may be arranged such that for radially adjacent joints between magnet sections, the joints are axially spaced from each other, to produce a magnetic field with a magnetic flux density that changes substantially continuously in magnitude in the axial direction substantially along the length of the at least one magnet in the axial direction. In this respect, radially adjacent joints between magnet sections are overlapped axially by magnets of an adjacent layer such that no joints between magnet sections in radially adjacent layers are axially aligned. The lengths and overlapping arrangements of the magnets (and magnet sections) may be varied.

In the seventh and eighth embodiments the magnetic field generator 50 comprises a plurality of sets 111 of magnets 95, 96, 97, 98 of different lengths. Each magnet 95, 96, 97, 98 is formed by a single magnet. Alternatively, each magnet 95, 96, 97, 98 may be formed by a plurality of magnet sections joined end to end. This allows shorter magnets to be used, which is advantageous in terms of ease of manufacture.

In this case, the magnets may be arranged such that for radially adjacent joints between magnet sections, the joints are axially spaced from each other, to produce a magnetic field with a magnetic flux density that changes substantially continuously in magnitude in the axial direction substantially along the length of the at least one magnet in the axial direction. In this respect, radially adjacent joints between magnet sections are overlapped axially by magnets of an adjacent layer such that no joints between magnet sections in radially adjacent layers are axially aligned. The lengths and overlapping arrangements of the magnets (and magnet sections) may be varied.

The number of magnets used in any of the described embodiments may be varied.

In the described embodiments the magnetic sensors are Hall-effect sensors. However, the magnetic sensors may be any suitable type of magnetic sensor, for example, magneto-resistive elements or GMR (giant magneto-resistive) technology.

In the described embodiments the magnetic material of the magnetic field generator 50 is arranged such that it produces a magnetic field with a magnetic flux density that changes substantially continuously in magnitude in the axial direction substantially along the length of magnetic field generator in the axial direction. This is achieved by varying the amount of magnetic material in a plane substantially perpendicular to the axis with the axial position of the plane and/or by varying the distance between the magnetic material and the axis, at each axial position, with axial position.

Alternatively, or additionally, the density of the magnetic material may be varied with axial position such that it produces a magnetic field with a magnetic flux density that changes substantially continuously in magnitude in the axial direction substantially along the length of the magnetic field generator in the axial direction.

Alternatively, or additionally, the strength of the magnetic material may be varied with axial position such that it produces a magnetic field with a magnetic flux density that changes substantially continuously in magnitude in the axial direction substantially along the length of the magnetic field in the axial direction.

The strength of the magnetic material may be varied with axial position by varying the chemical composition of the magnetic material with axial position such that it produces a magnetic field with a magnetic flux density that changes substantially continuously in magnitude in the axial direction substantially along the length of the magnetic field generator in the axial direction.

It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A magnetic field generator comprising a plurality of magnets, the plurality of magnets being distributed circumferentially about, and extending along, a longitudinal axis, wherein the magnetic material of the plurality of magnets is arranged such that the plurality of magnets produce a magnetic field with a magnetic flux density that changes substantially continuously in magnitude in the axial direction substantially along a length of the magnetic field generator;
   wherein the plurality of magnets have different lengths in the axial direction and overlap in the axial direction such that the amount of magnetic material of the plurality of magnets in a plane substantially perpendicular to the longitudinal axis varies with the axial position of the plane such that the plurality of magnets produce a magnetic field with a magnetic flux density that changes substantially continuously in magnitude in the axial direction substantially along the length of the magnetic field generator; and
   wherein the plurality of magnets are located at substantially a same radius from the longitudinal axis.

2. The magnetic field generator according to claim 1, wherein the amount of magnetic material is varied by at least one discrete change in the amount of magnetic material in said plane as the axial position of the plane varies.

3. The magnetic field generator according to claim 1, wherein the plurality of magnets extend in the axial direction from a first end, that forms a first pole, to a second end, that forms a second pole, wherein the amount of magnetic material in said plane increases from the first and/or second ends of the plurality of magnets towards the midpoint between the first and second ends.

4. The magnetic field generator according to claim 1, wherein the plurality of magnets are disposed within a wall of a housing of non-magnetic material.

5. The magnetic field generator according to claim 4, wherein each magnet of the plurality of magnets is received within a bore in the wall of the housing.

6. The magnetic field generator according to claim 4, wherein each magnet of the plurality of magnets is substantially enclosed by the non-magnetic material.

7. The magnetic field generator according to claim 4, wherein the magnetic field generator comprises one or more sets of magnets, each set comprising at least a pair of magnets of different lengths disposed within the wall of the housing.

8. The magnetic field generator according to claim 1, wherein the strength of the magnetic material of the plurality of magnets is varied with axial position such that the plurality of magnets produce a magnetic field with a magnetic flux density that changes substantially continuously in magnitude in the axial direction substantially along the length of the magnetic field generator.

9. A position sensing assembly comprising a movable member arranged to move along an axis, wherein the magnetic field generator according to claim 1 is coupled to the movable member, to move with the movable member, and a magnetic sensor arrangement comprising at least one magnetic sensor arranged to determine the axial position of the magnetic field generator.

* * * * *